(12) United States Patent
Harel et al.

(10) Patent No.: US 8,983,548 B2
(45) Date of Patent: Mar. 17, 2015

(54) MULTI-BEAM CO-CHANNEL WI-FI ACCESS POINT

(71) Applicant: Magnolia Broadband Inc., Englewood, NJ (US)

(72) Inventors: Haim Harel, New York, NY (US); Phil F. Chen, Denville, NJ (US); Kenneth Kludt, San Jose, CA (US); Stuart S. Jeffery, Los Altos, CA (US); Sherwin J. Wang, Towaco, NJ (US); Eduardo Abreu, Allentown, PA (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 14/011,521

(22) Filed: Aug. 27, 2013

(65) Prior Publication Data
US 2014/0226453 A1    Aug. 14, 2014

Related U.S. Application Data

(63) Continuation of application No. 13/858,302, filed on Apr. 8, 2013.
(60) Provisional application No. 61/764,209, filed on Feb. 13, 2013.

(51) Int. Cl.
*H04M 1/00* (2006.01)
*H03D 1/04* (2006.01)
(Continued)

(52) U.S. Cl.
CPC ............ *H04L 5/0023* (2013.01); *H04B 7/0413* (2013.01)
USPC ........................................ 455/562.1; 375/346

(58) Field of Classification Search
CPC ..... H04W 16/28; H04W 40/06; H04W 40/16; H04W 72/082; H04L 1/00
USPC ................ 370/338; 375/346; 455/63.1, 562.1
See application file for complete search history.

(56) References Cited

U.S. PATENT DOCUMENTS

| 4,044,359 A | 8/1977 | Applebaum et al. |
| 4,079,318 A | 3/1978 | Kinoshita |

(Continued)

FOREIGN PATENT DOCUMENTS

| EP | 1 529 353 | 5/2005 |
| EP | 1 867 177 | 5/2010 |

(Continued)

OTHER PUBLICATIONS

Office Action issued by the United States Patent and Trademark Office for U.S. Appl. No. 13/630,146 dated Jan. 22, 2013.

(Continued)

*Primary Examiner* — Dang Ton
*Assistant Examiner* — Ryan Kavleski
(74) *Attorney, Agent, or Firm* — Pearl Cohen Zedek Latzer Baratz LLP

(57) ABSTRACT

A system and method for providing multi-beam Wi-Fi access points. The system includes one or more Wi-Fi transmit antennas beamformers; one or more Wi-Fi receive antennas or receive beamformers; and a number N of co-channel Wi-Fi access points (APs) and a number of M non co-channel APS, where all APs comply with IEEE802.11xx standard, connected to the Wi-Fi transmit antennas beamformers, wherein the Wi-Fi transmit antennas beamformers are configured to produce a plurality of non spatially adjacent beams of a common frequency, directed at a plurality of Wi-Fi user equipment (UE) such that the directional beams are sufficiently isolated from each other, and at least some of the Wi-Fi UEs communicate simultaneously with the plurality of Wi-Fi access points.

28 Claims, 28 Drawing Sheets

(51) Int. Cl.
*H04L 5/00* (2006.01)
*H04B 7/04* (2006.01)

(56) References Cited

U.S. PATENT DOCUMENTS

| | | | |
|---|---|---|---|
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |
| 5,363,104 A | 11/1994 | Richmond | |
| 5,444,762 A | 8/1995 | Frey et al. | |
| 5,732,075 A * | 3/1998 | Tangemann et al. | 370/343 |
| 5,915,215 A | 6/1999 | Williams et al. | |
| 5,936,577 A * | 8/1999 | Shoki et al. | 342/373 |
| 5,940,033 A | 8/1999 | Locher et al. | |
| 6,018,317 A | 1/2000 | Dogan et al. | |
| 6,046,655 A | 4/2000 | Cipolla | |
| 6,101,399 A | 8/2000 | Raleigh et al. | |
| 6,163,695 A | 12/2000 | Takemura | |
| 6,167,286 A | 12/2000 | Ward et al. | |
| 6,215,812 B1 * | 4/2001 | Young et al. | 375/144 |
| 6,226,507 B1 | 5/2001 | Ramesh et al. | |
| 6,230,123 B1 | 5/2001 | Mekuria et al. | |
| 6,259,683 B1 | 7/2001 | Sekine et al. | |
| 6,297,772 B1 | 10/2001 | Lewis | |
| 6,321,077 B1 | 11/2001 | Saitoh et al. | |
| 6,335,953 B1 | 1/2002 | Sanderford et al. | |
| 6,370,378 B1 | 4/2002 | Yahagi | |
| 6,377,783 B1 | 4/2002 | Lo et al. | |
| 6,393,282 B1 | 5/2002 | Iimori | |
| 6,584,115 B1 | 6/2003 | Suzuki | |
| 6,697,622 B1 | 2/2004 | Ishikawa et al. | |
| 6,697,633 B1 | 2/2004 | Dogan et al. | |
| 6,799,054 B2 | 9/2004 | Shpak | |
| 6,834,073 B1 | 12/2004 | Miller et al. | |
| 6,842,460 B1 | 1/2005 | Olkkonen et al. | |
| 6,907,229 B2 | 6/2005 | Shpak | |
| 6,927,646 B2 | 8/2005 | Niemi | |
| 6,975,582 B1 * | 12/2005 | Karabinis et al. | 370/204 |
| 6,987,958 B1 | 1/2006 | Lo et al. | |
| 7,035,243 B2 | 4/2006 | Shpak | |
| 7,068,628 B2 | 6/2006 | Li et al. | |
| 7,177,663 B2 | 2/2007 | Axness et al. | |
| 7,190,964 B2 | 3/2007 | Damnjanovic et al. | |
| 7,257,425 B2 | 8/2007 | Wang et al. | |
| 7,299,072 B2 | 11/2007 | Ninomiya | |
| 7,319,688 B2 | 1/2008 | Shpak | |
| 7,391,757 B2 | 6/2008 | Haddad et al. | |
| 7,392,015 B1 | 6/2008 | Farlow et al. | |
| 7,474,676 B2 | 1/2009 | Tao et al. | |
| 7,499,109 B2 | 3/2009 | Kim et al. | |
| 7,512,083 B2 | 3/2009 | Li | |
| 7,606,528 B2 | 10/2009 | Mesecher | |
| 7,634,015 B2 | 12/2009 | Waxman | |
| 7,646,744 B2 | 1/2010 | Li | |
| 7,697,549 B2 | 4/2010 | Eran | |
| 7,719,993 B2 | 5/2010 | Li et al. | |
| 7,742,000 B2 | 6/2010 | Mohamadi | |
| 7,769,107 B2 | 8/2010 | Sandhu et al. | |
| 7,797,016 B2 | 9/2010 | Eran et al. | |
| 7,813,738 B2 | 10/2010 | Shpak | |
| 7,898,478 B2 | 3/2011 | Niu et al. | |
| 7,933,255 B2 | 4/2011 | Li | |
| 7,970,366 B2 | 6/2011 | Arita et al. | |
| 8,078,109 B1 | 12/2011 | Mulcay | |
| 8,115,679 B2 | 2/2012 | Falk | |
| 8,155,613 B2 | 4/2012 | Kent et al. | |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 | 2/2013 | Stirling-Gallacher | |
| 8,509,190 B2 | 8/2013 | Rofougaran | |
| 8,520,657 B2 | 8/2013 | Rofougaran | |
| 8,526,886 B2 | 9/2013 | Wu et al. | |
| 8,588,844 B2 | 11/2013 | Shpak | |
| 8,599,955 B1 | 12/2013 | Kludt et al. | |
| 8,599,979 B2 | 12/2013 | Farag et al. | |
| 8,644,413 B2 | 2/2014 | Harel et al. | |
| 8,649,458 B2 | 2/2014 | Kludt et al. | |
| 8,666,319 B2 | 3/2014 | Kloper et al. | |
| 8,744,511 B2 | 6/2014 | Jones et al. | |
| 8,767,862 B2 | 7/2014 | Abreu et al. | |
| 8,780,743 B2 | 7/2014 | Sombrutzki et al. | |
| 2001/0029326 A1 | 10/2001 | Diab et al. | |
| 2001/0038665 A1 | 11/2001 | Baltersee et al. | |
| 2002/0024975 A1 | 2/2002 | Hendler | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 * | 8/2002 | Fitzgerald | 455/423 |
| 2002/0115474 A1 | 8/2002 | Yoshino et al. | |
| 2002/0181426 A1 | 12/2002 | Sherman | |
| 2002/0181437 A1 | 12/2002 | Ohkubo et al. | |
| 2003/0114162 A1 | 6/2003 | Chheda et al. | |
| 2003/0153322 A1 | 8/2003 | Burke et al. | |
| 2003/0153360 A1 | 8/2003 | Burke et al. | |
| 2003/0186653 A1 | 10/2003 | Mohebbi et al. | |
| 2003/0203717 A1 | 10/2003 | Chuprun et al. | |
| 2003/0203743 A1 | 10/2003 | Sugar et al. | |
| 2004/0056795 A1 | 3/2004 | Ericson et al. | |
| 2004/0063455 A1 | 4/2004 | Eran et al. | |
| 2004/0081144 A1 | 4/2004 | Martin et al. | |
| 2004/0121810 A1 | 6/2004 | Goransson et al. | |
| 2004/0125899 A1 | 7/2004 | Li et al. | |
| 2004/0125900 A1 | 7/2004 | Liu et al. | |
| 2004/0142696 A1 | 7/2004 | Saunders et al. | |
| 2004/0147266 A1 | 7/2004 | Hwang et al. | |
| 2004/0156399 A1 | 8/2004 | Eran | |
| 2004/0166902 A1 | 8/2004 | Castellano et al. | |
| 2004/0198292 A1 | 10/2004 | Smith et al. | |
| 2004/0228388 A1 | 11/2004 | Salmenkaita | |
| 2004/0235527 A1 | 11/2004 | Reudink et al. | |
| 2004/0264504 A1 | 12/2004 | Jin | |
| 2005/0068230 A1 * | 3/2005 | Munoz et al. | 342/359 |
| 2005/0068918 A1 | 3/2005 | Mantravadi et al. | |
| 2005/0075140 A1 * | 4/2005 | Famolari | 455/562.1 |
| 2005/0129155 A1 | 6/2005 | Hoshino | |
| 2005/0147023 A1 * | 7/2005 | Stephens et al. | 370/203 |
| 2005/0163097 A1 | 7/2005 | Do et al. | |
| 2005/0195786 A1 | 9/2005 | Shpak | |
| 2005/0245224 A1 | 11/2005 | Kurioka | |
| 2005/0250544 A1 | 11/2005 | Grant et al. | |
| 2005/0265436 A1 | 12/2005 | Suh et al. | |
| 2005/0287962 A1 | 12/2005 | Mehta et al. | |
| 2006/0041676 A1 | 2/2006 | Sherman | |
| 2006/0092889 A1 | 5/2006 | Lyons et al. | |
| 2006/0094372 A1 | 5/2006 | Ahn et al. | |
| 2006/0098605 A1 | 5/2006 | Li | |
| 2006/0111149 A1 | 5/2006 | Chitrapu et al. | |
| 2006/0135097 A1 | 6/2006 | Wang et al. | |
| 2006/0183503 A1 | 8/2006 | Goldberg | |
| 2006/0203850 A1 | 9/2006 | Johnson et al. | |
| 2006/0209771 A1 | 9/2006 | Shpak | |
| 2006/0227854 A1 | 10/2006 | McCloud et al. | |
| 2006/0264184 A1 | 11/2006 | Li et al. | |
| 2006/0270343 A1 | 11/2006 | Cha et al. | |
| 2006/0271969 A1 | 11/2006 | Takizawa et al. | |
| 2006/0285507 A1 | 12/2006 | Kinder et al. | |
| 2007/0037595 A1 | 2/2007 | Shpak | |
| 2007/0041398 A1 | 2/2007 | Benveniste | |
| 2007/0058581 A1 | 3/2007 | Benveniste | |
| 2007/0076675 A1 | 4/2007 | Chen | |
| 2007/0093261 A1 | 4/2007 | Hou et al. | |
| 2007/0097918 A1 | 5/2007 | Cai et al. | |
| 2007/0115914 A1 | 5/2007 | Ohkubo et al. | |
| 2007/0152903 A1 | 7/2007 | Lin et al. | |
| 2007/0223380 A1 | 9/2007 | Gilbert et al. | |
| 2007/0249386 A1 | 10/2007 | Bennett | |
| 2008/0043867 A1 | 2/2008 | Blanz et al. | |
| 2008/0051037 A1 | 2/2008 | Molnar et al. | |
| 2008/0081671 A1 | 4/2008 | Wang et al. | |
| 2008/0112373 A1 | 5/2008 | Shpak | |
| 2008/0144737 A1 | 6/2008 | Naguib | |

(56) References Cited

U.S. PATENT DOCUMENTS

| | | |
|---|---|---|
| 2008/0165732 A1 | 7/2008 | Kim et al. |
| 2008/0181146 A1 | 7/2008 | Doan |
| 2008/0238808 A1 | 10/2008 | Arita et al. |
| 2008/0240314 A1 | 10/2008 | Gaal et al. |
| 2008/0267142 A1 | 10/2008 | Mushkin et al. |
| 2008/0280571 A1 | 11/2008 | Rofougaran et al. |
| 2008/0285637 A1 | 11/2008 | Liu et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0137206 A1 | 5/2009 | Sherman et al. |
| 2009/0154419 A1 | 6/2009 | Yoshida et al. |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0285331 A1 | 11/2009 | Sugar et al. |
| 2009/0322610 A1* | 12/2009 | Hants et al. .................. 342/372 |
| 2009/0322613 A1 | 12/2009 | Bala et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0111039 A1 | 5/2010 | Kim et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0165968 A1 | 7/2010 | Shpak |
| 2010/0172429 A1 | 7/2010 | Nagahama et al. |
| 2010/0195560 A1 | 8/2010 | Nozaki et al. |
| 2010/0222011 A1 | 9/2010 | Behzad |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1* | 1/2011 | Karaoguz et al. ............. 370/331 |
| 2011/0032849 A1* | 2/2011 | Yeung et al. .................. 370/280 |
| 2011/0032972 A1 | 2/2011 | Wang et al. |
| 2011/0085532 A1 | 4/2011 | Scherzer et al. |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1 | 12/2011 | Srinivasa et al. |
| 2011/0310853 A1 | 12/2011 | Yin et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1 | 3/2012 | Merlin et al. |
| 2012/0064838 A1 | 3/2012 | Miao et al. |
| 2012/0076028 A1 | 3/2012 | Ko et al. |
| 2012/0076229 A1 | 3/2012 | Brobston et al. |
| 2012/0088512 A1 | 4/2012 | Yamada et al. |
| 2012/0115523 A1 | 5/2012 | Shpak |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0314570 A1 | 12/2012 | Forenza et al. |
| 2012/0321015 A1 | 12/2012 | Hansen et al. |
| 2013/0010623 A1 | 1/2013 | Golitschek |
| 2013/0017794 A1 | 1/2013 | Kloper et al. |
| 2013/0023225 A1 | 1/2013 | Weber |
| 2013/0051283 A1 | 2/2013 | Lee et al. |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0156120 A1 | 6/2013 | Josiam et al. |
| 2013/0170388 A1 | 7/2013 | Ito et al. |
| 2013/0208587 A1 | 8/2013 | Bala et al. |
| 2013/0208619 A1 | 8/2013 | Kudo et al. |
| 2013/0223400 A1 | 8/2013 | Seo et al. |
| 2013/0229996 A1 | 9/2013 | Wang et al. |
| 2013/0229999 A1 | 9/2013 | Da Silva et al. |
| 2013/0235720 A1 | 9/2013 | Wang et al. |
| 2013/0242853 A1 | 9/2013 | Seo et al. |
| 2013/0242899 A1 | 9/2013 | Lysejko et al. |
| 2013/0242976 A1 | 9/2013 | Katayama et al. |
| 2013/0272437 A1 | 10/2013 | Eidson et al. |
| 2013/0301551 A1 | 11/2013 | Ghosh et al. |
| 2013/0331136 A1 | 12/2013 | Yang et al. |
| 2013/0343369 A1 | 12/2013 | Yamaura |
| 2014/0010089 A1 | 1/2014 | Cai et al. |
| 2014/0071873 A1 | 3/2014 | Wang et al. |
| 2014/0086077 A1 | 3/2014 | Safavi |
| 2014/0086081 A1 | 3/2014 | Mack et al. |
| 2014/0098681 A1 | 4/2014 | Stager et al. |
| 2014/0185535 A1 | 7/2014 | Park et al. |
| 2014/0192820 A1 | 7/2014 | Azizi et al. |
| 2014/0307653 A1 | 10/2014 | Liu et al. |

FOREIGN PATENT DOCUMENTS

| | | |
|---|---|---|
| EP | 2 234 355 | 9/2010 |
| JP | 2009-278444 | 11/2009 |
| WO | WO 03/047033 | 6/2003 |
| WO | WO 03/073645 | 9/2003 |
| WO | WO 2004/015886 | 2/2004 |
| WO | WO 2006/092801 | 9/2006 |
| WO | WO 2007/017873 | 2/2007 |
| WO | WO 2010/085854 | 8/2010 |
| WO | WO 2011/060058 | 5/2011 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.

(56) References Cited

OTHER PUBLICATIONS

Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Hong et al., "Picasso: Flexible RF and Spectrum Slicing", SIGCOMM'12, Aug. 13-17, 2012, Helsinki, Finland.
Office Action issued by the United States Patent and Trademark Office for U.S. Appl. No. 14/171,736 dated Oct. 16, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.

(56) References Cited

OTHER PUBLICATIONS

Office Action issued by the United States Patent and Trademark Office for U.S. Appl. No. 14/042,020 dated Dec. 1, 2014.
Office Action issued by the United States Patent and Trademark Office for U.S. Appl. No. 13/888,057 dated Dec. 3, 2014.
Notice of Allowance issued by the United States Patent and Trademark Office for U.S. Appl. No. 14/297,898 dated Dec. 5, 2014.
Notice of Allowance issued by the United States Patent and Trademark Office for U.S. Appl. No. 14/281,358 dated Dec. 16, 2014.
Office Action issued by the United States Patent and Trademark Office for U.S. Appl. No. 14/250,767 dated Dec. 26, 2014.
Notice of Allowance issued by the United States Patent and Trademark Office for U.S. Appl. No. 14/097,765 dated Dec. 31, 2014.
Office Action issued by the United States Patent and Trademark Office for U.S. Appl. No. 14/181,844 dated Jan. 5, 2015.

* cited by examiner

MULTI-BEAM CO-CHANNEL WI-FI ACCESS POINT

CROSS-REFERENCE TO RELATED APPLICATIONS

This application is a continuation application of U.S. patent application Ser. No. 13/858,302 filed on Apr. 8, 2013, which claims benefit of U.S. Provisional Patent Application No. 61/764,209 filed on Feb. 13, 2013, all of which are incorporated herein by reference in their entirety.

FIELD OF THE INVENTION

The present invention relates generally to the field of radio frequency (RF) multiple-input-multiple-output (MIMO) systems, Wi-Fi (e.g., 802.11a, b, g, ac, n), and in particular to systems and methods for implementing Multi-Beam basestation architecture for Wi-Fi protocol.

BACKGROUND

Prior to setting forth a short discussion of the related art, it may be helpful to set forth definitions of certain terms that will be used hereinafter.

The term "Wi-Fi" as used herein, may include a wireless communication exchange of data over a computer network, which includes high-speed Internet connections. The Wi-Fi Alliance defines Wi-Fi as any "wireless local area network (WLAN) products that are based on the Institute of Electrical and Electronics Engineers' (IEEE) 802.11 standards". Wi-Fi access points (APs) are Wi-Fi base stations configured to communicate with the wireless devices and connect with the communication network over wires. Wi-Fi User Equipment (UE) devices (which may be referred to as "UEs") are Wi-Fi devices that connect via Wi-Fi with the Wi-Fi access points.

While WiMAX and LTE, multi-channel Time-Domain-Duplex (TDD) basestations typically synchronize Transmitter/Receiver time interval amongst themselves, in order to avoid self jamming, the Wi-Fi 802.11 protocol does not normally lend itself to such synchronization, since it is a contention based (e.g., Carrier Sense Multiple Access/Collision avoidance based) protocol with little or no central control, granting independent Transmitter/Receiver switching for each channel.

Therefore, co-location of co-channel Wi-Fi APs presents a challenge since one AP's transmission would block others'; additionally, APs may jam each other's subscribers' acknowledgments, causing excessive retransmissions and loss, rather than gain of capacity.

Thus, Multi-Cell deployment efficiency depends on significant isolation between Wi-Fi cells, a condition that suits indoors applications, where walls attenuation plays a positive role; residential environments enjoy both such isolation as well as light loading created by relatively few users per AP.

Wi-Fi outdoors deployments, however, have both large users' count and poor Cell-to-Cell and Station-to-Station isolation.

SUMMARY

Embodiments of the present invention may facilitate intensive frequency reuse per cell; by addressing the mechanism that hampers co-location of co-channel APs, via introduction of beamforming based super isolation between transmitters' assembly and receivers' assembly of co-located co-channel Access Points (APs).

Embodiments of the present invention may provide intensive attenuation of UE transmissions signals received by non-serving APs, via beamforming means.

According to one embodiment of the present invention, a system for providing multi-beam Wi-Fi access points is provided herein. The system may enable virtually co-located, co-channel Wi-Fi Access Points (APs) to perform with reduced inter-dependency by separating receive and transmit AP's signals, and by reducing cross talk between AP's receiving beams. The system may include, for example, the following elements: one or more Wi-Fi transmit antennas beamformers; one or more Wi-Fi receive antennas; and a number N of co-channel Wi-Fi access points (APs), and M non co-channel Wi-Fi APs which comply with the IEEE 802.11 standard, connected to the Wi-Fi transmit antennas beamformers, wherein the Wi-Fi transmit antennas beamformers are configured to produce a plurality of directional beams, directed at a plurality of Wi-Fi user equipment (UE) such that non spatially adjacent directional beams are sufficiently isolated from each other, so that at least some of the Wi-Fi UEs communicate simultaneously, concurrently, or substantially at the same time with the plurality of Wi-Fi access points.

Embodiments of the present invention enable the implementation of a system that facilitates the implementation of Multi-Beam MIMO architecture for the Wi-Fi IEEE 802.11 standard.

These additional, and/or other aspects and/or advantages of the present invention are set forth in the detailed description which follows.

It should be noted that Wi-Fi clients are referred to in this text as stations or UEs or UE devices, while Wi-Fi Access Points are referred to as APs

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

Figure 1:
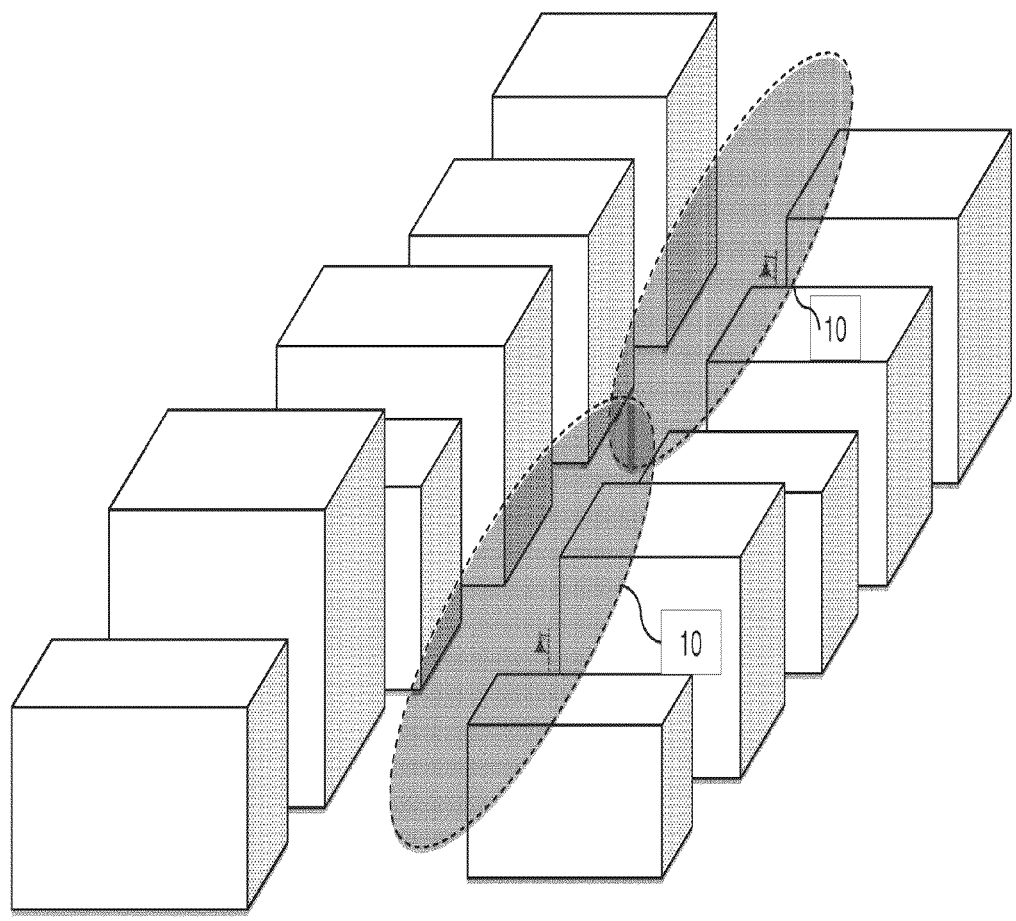
FIG. 1 illustrates an exemplary Municipal Wi-Fi deployment, based on Omni Directional AP mounted on lamppost, according to the prior art (aspects of FIG. 1 may be used with embodiments of the present invention)

The drawings together with the following detailed description make the embodiments of the invention apparent to those skilled in the art.

DETAILED DESCRIPTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

FIG. 1 shows legacy Wi-Fi APs which are typically implemented with Omni directional antennas, and when deployed outdoors in accordance with the prior art. These Wi-Fi APs are frequently deployed in urban areas over lamppost and produce omni directional coverage 10.

Figure 2:
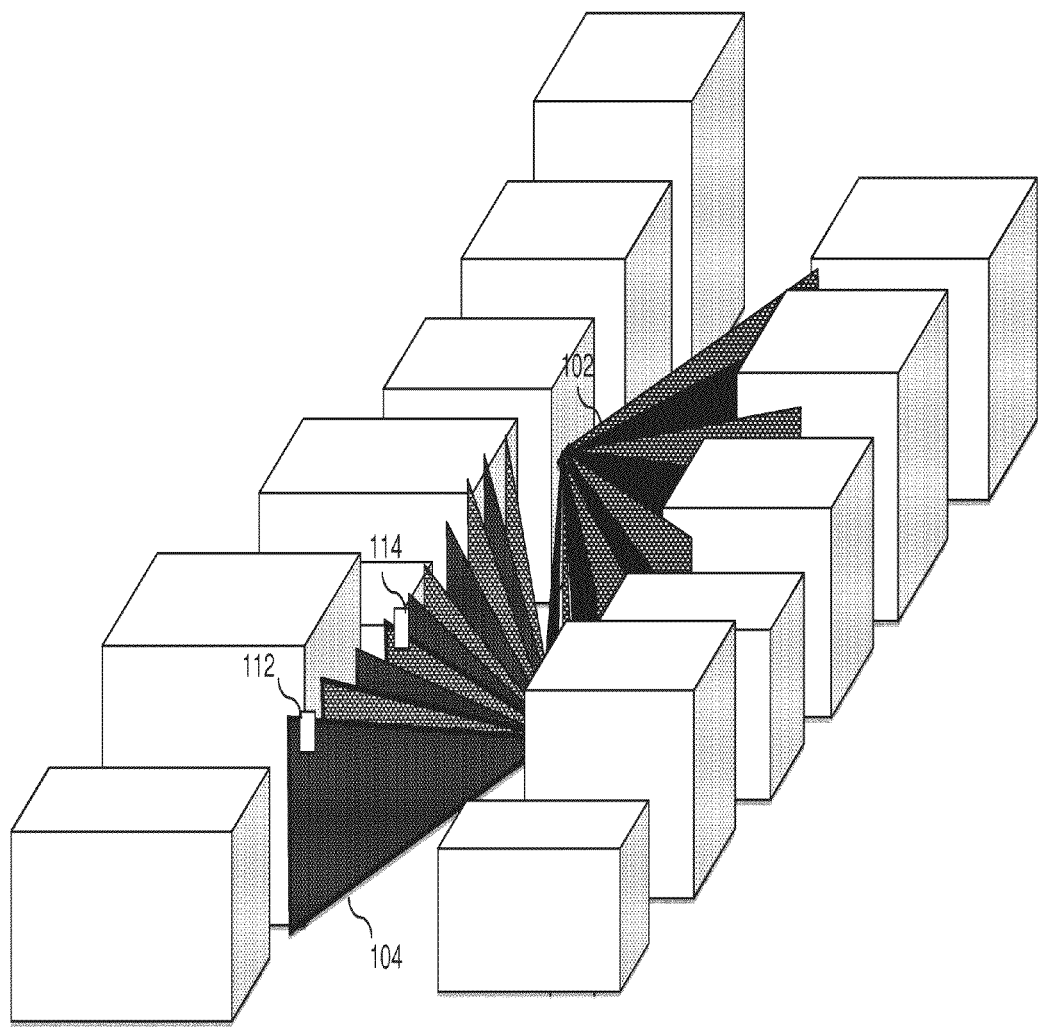
FIG. 2 illustrates a sector Wi-Fi base station mounted on a wall, splitting the sector into multiple beams, each feeding a separate AP, where coverage of both sides of a given street is accomplished by alternating mounting points left side/right side of the street, in accordance with some embodiments of the present invention.
Figure 3:
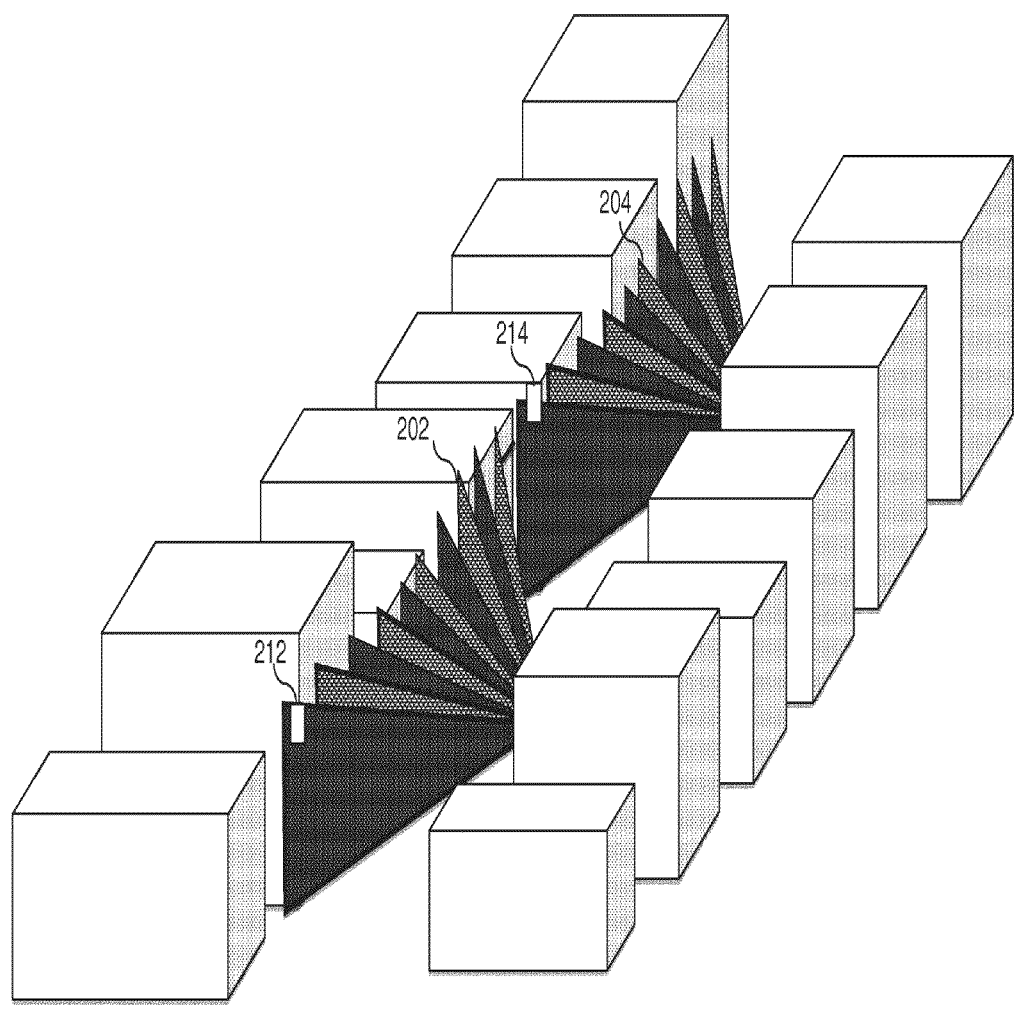
FIG. 3 illustrates another example of sectors deployment in accordance with some embodiments of the present invention.

FIGS. 2 and 3 are high level block diagrams illustrating deployment of multi beam Wi-Fi APs 102, 104 202 and 204 in accordance with embodiments of the present invention serving UEs 112, 114 and 212, 214 respectively. The distributed nature of CSMA protocols and 802.11 Wi-Fi in particular, generates little central control and limited predictability of time slices allocated to AP and its various Clients for transmissions. Unlike other wireless protocols like GSM, CDMA, LTE, the Wi-Fi protocol prohibits transmission in presence of identified contention, even one with a very low signal level, while Cellular transmission will normally take place regardless of interference and be successful if signal to noise plus interferences (SINR) is sufficient.

For comparison, TDD Multi-User Cellular protocol base stations can switch simultaneously or concurrently between Transmission and Reception, due to their full control on who does what and when; a cluster of Wi-Fi APs feeding similar co-located set of beams, will each switch between Receiver and Transmitter independently, jamming each other on many occasions; while the former is capable of reusing the spectrum up to N folds, where N is the number of directional beams created by the base station, the latter effort to carry N independent data streams will result in self AP to AP as well as UEs to APs frequent jamming, adversely affecting overall capacity.

Embodiments of the present invention describe a method of clustering Wi-Fi multiple concurrent APs operating independently using legacy PHY and MAC 802.11 protocol, implementing multi-beam, as described in FIG. 2 and FIG. 3.

In order to allow for one AP's receiver to be oblivious to or not recognize another AP transmitting close by on the same frequency channel, the required isolation is calculated as follows: Assuming EIRP of +23 dBm should be brought down or reduces to noise level of some −90 dBm=113 dB. Note that when activating more than one co-channel over same antenna array, the summation of their power may be limited to the ceiling (in this case to +23 dBm); for example, 4 such co-channel APs may be using in such a case up to 17 dBm each.

Figure 4:
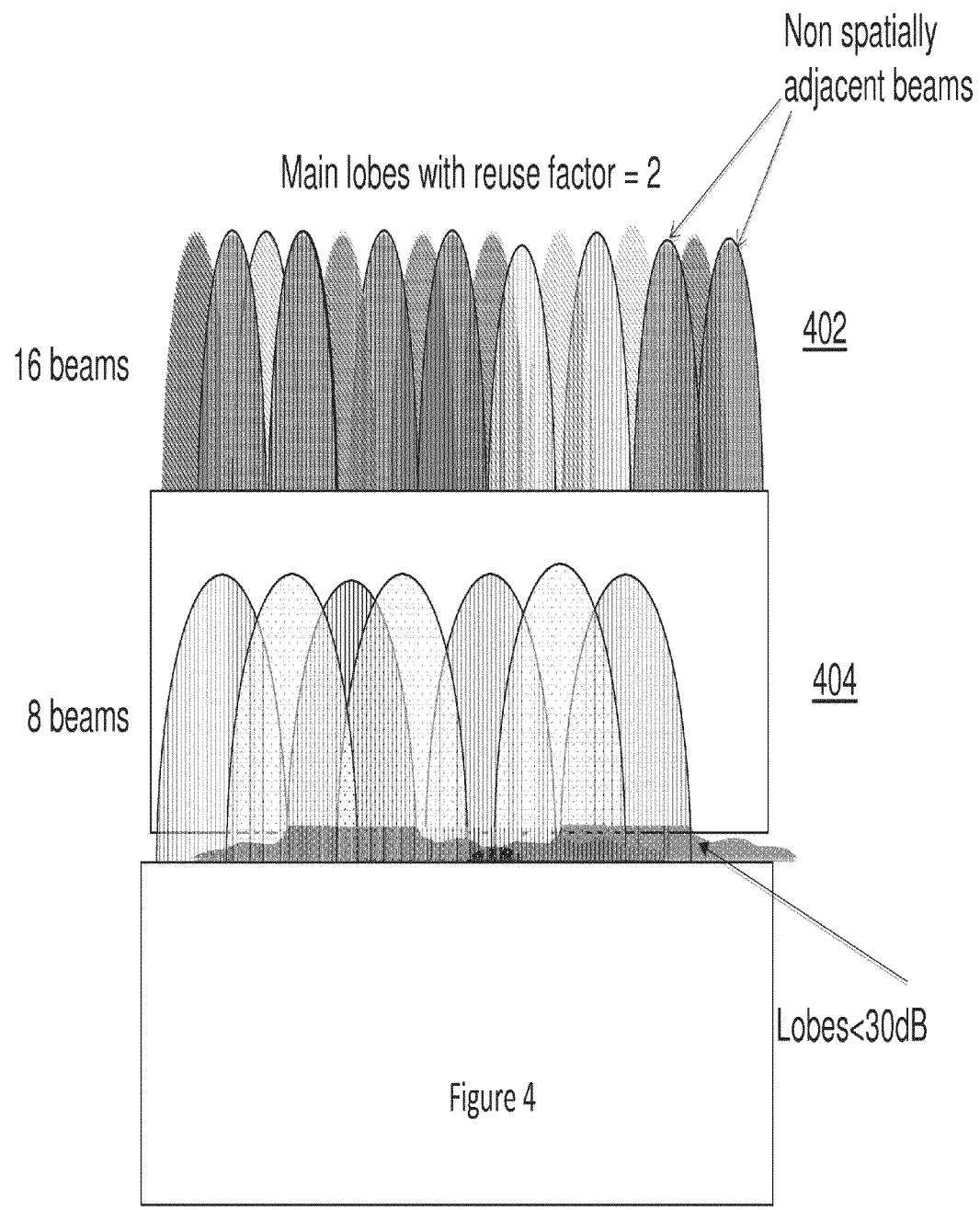
FIG. 4 is an example of beams patterns originated by a beamformer in accordance with embodiments of the present invention.

FIG. 4 describes exemplary multi-beam structures 402 and 404 where beams cover a given sector, where each non spatially adjacent beam can reuse the same frequency channel due to low side lobe 405 implementation that may facilitate SINR equal or larger than 30 dB in presence of each other. Such architecture can span the entire cell coverage with two different channels, i.e. with Reuse Factor=2.

Figure 5A:
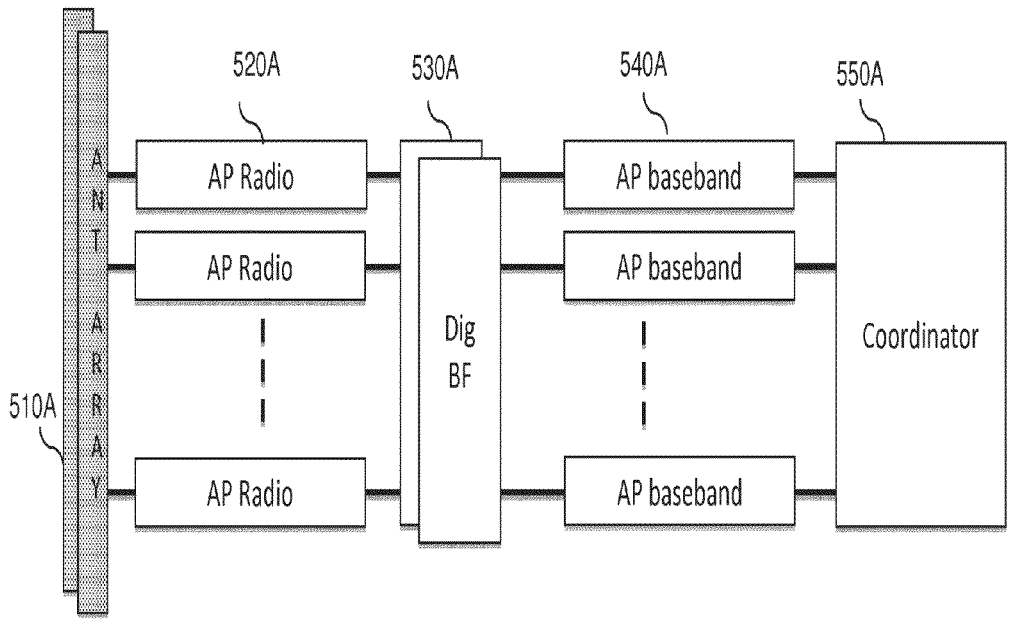
FIG. 5A is a block diagram describing a digital beamforming implementation in accordance with embodiments of the present invention.
Figure 5B:
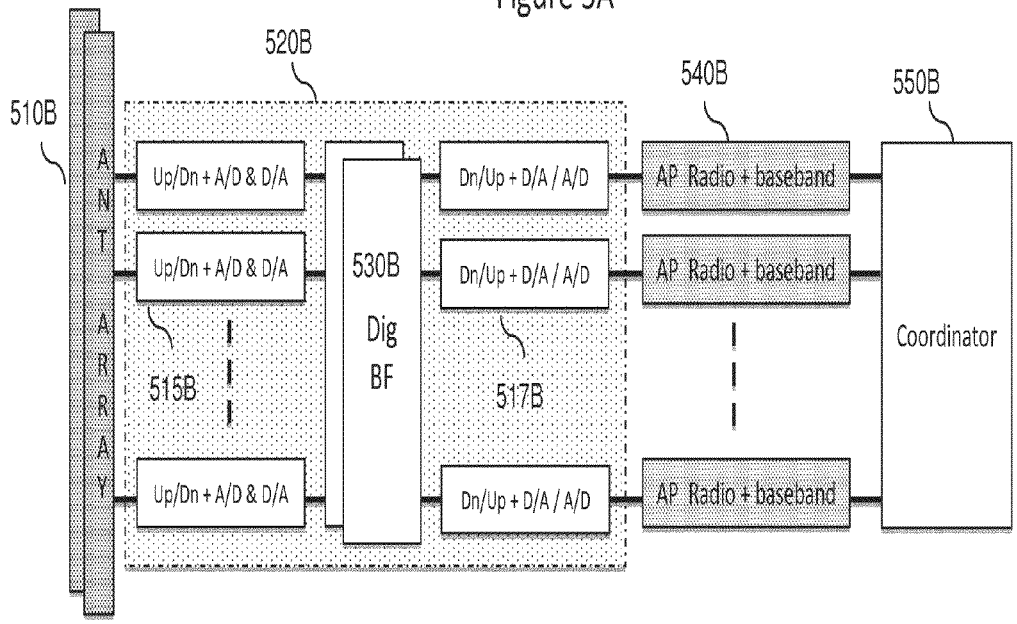
FIG. 5B is a block diagram describing a digital beamforming implementation in accordance with embodiments of the present invention.

FIGS. 5A and 5B describe two methods of implementing digital beamforming for multiple Access Points; FIG. 5A describes antennas array 510A, radio circuitries 520A, digital beamforming module 530A baseband processors 540A and a coordinator 550A This architecture leads to a separation of AP circuitry into processor 540A and radio 520A—at the digital interface 530A that connects them.

According to some embodiments of the invention, the digital beamforming is performed by using integrated Wi-Fi AP chip, converting all of their transmission RF paths into low frequency and digitizing it, converting all of their receiving RF paths into low frequency and digitizing it, feeding said digital signals into a digital processing module which performs beamforming, tapering and cancellation, and then converting the outputs of the said digital processing module back to RF level and feeding the transmission and the receiving antenna arrays.

According to some embodiments of the invention, the digital beamforming is performed by separating AP chip sets into two parts, one being the transceiver, the other being the baseband, lining up the latter in groups and connecting them to inputs of a digital processing module which performs beam forming, tapering, and cancellation, the former in similar groups and connecting them to the outputs of the said digital processing module, wherein the RF portion of the said transceivers are connected to a Transmission Antenna Array and a Receiving Antenna Array.

FIG. 5B describes antennas array 510B, beamforming module 520B which includes analog to digital modules 515B digital beamformers 530B and digital to analog modules 517B. radio circuitries and baseband processors are integrated into a monolithic module 540B and a coordinator 550B. This alternative architecture keeps the AP's radio and processor in its integrated form 540B; in that configuration, separation is done between the AP radio and the antennas, and the RF signals are converted to digital and then back to RF, creating a placeholder for digital manipulations.

Figure 6:
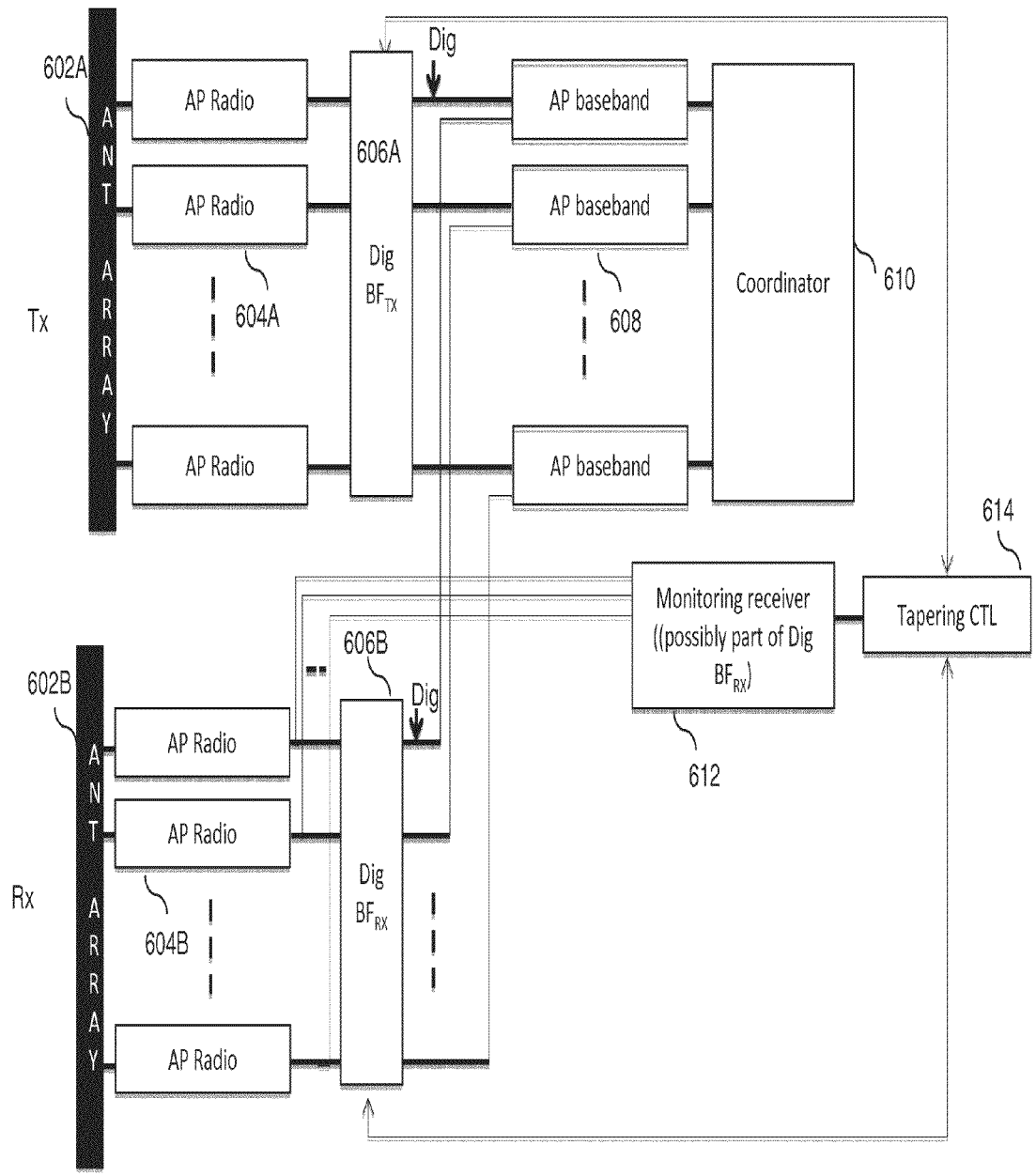
FIG. 6 describes a block diagram of digital beamforming implementing closed-loop antenna array's elements tapering in accordance with embodiments of the present invention.

FIG. 6 describes closed loop tapering implemented for FIG. 5A although the description is similar for FIG. 5B. This architecture includes antennas array 602A, 602B radio circuitries 604A, 604B, digital beamforming module 606A, 606B baseband processors 608 a coordinator 610 a monitoring receiver 612 and a tapering control module 614. Antenna tapering is a technique that manipulates current and voltage distribution across the antenna or antenna array aperture, in order to improve performance; in this invention, tapering manipulates phase and amplitude of signals antenna terminating elements in an array, in order to reduce side lobes.

Closed loop tapering further enhances performance as it is supported by monitoring the results. Such monitoring is performed by measurement of the undesired Tx signal appearing in a given receiving antenna element of a combination of antenna elements (i.e. a receiving beam); tapering of both the Tx and the Rx arrays is done so that the Tx signal at the Rx receiver is minimized.

According to some embodiments of the invention, the directional beams have a side lobe pattern of approximately −30 dB, achieved via digital tapering, implemented by both mathematical calculation and closed loop cancellation using feedback from at least one of: UE devices and calibration transmitters.

According to some embodiments of the invention, the receive and/or transmit antennas comprise an array of antenna elements and wherein said arrays are implemented with tapering that further reduces side lobe levels of the beams.

Figure 7:
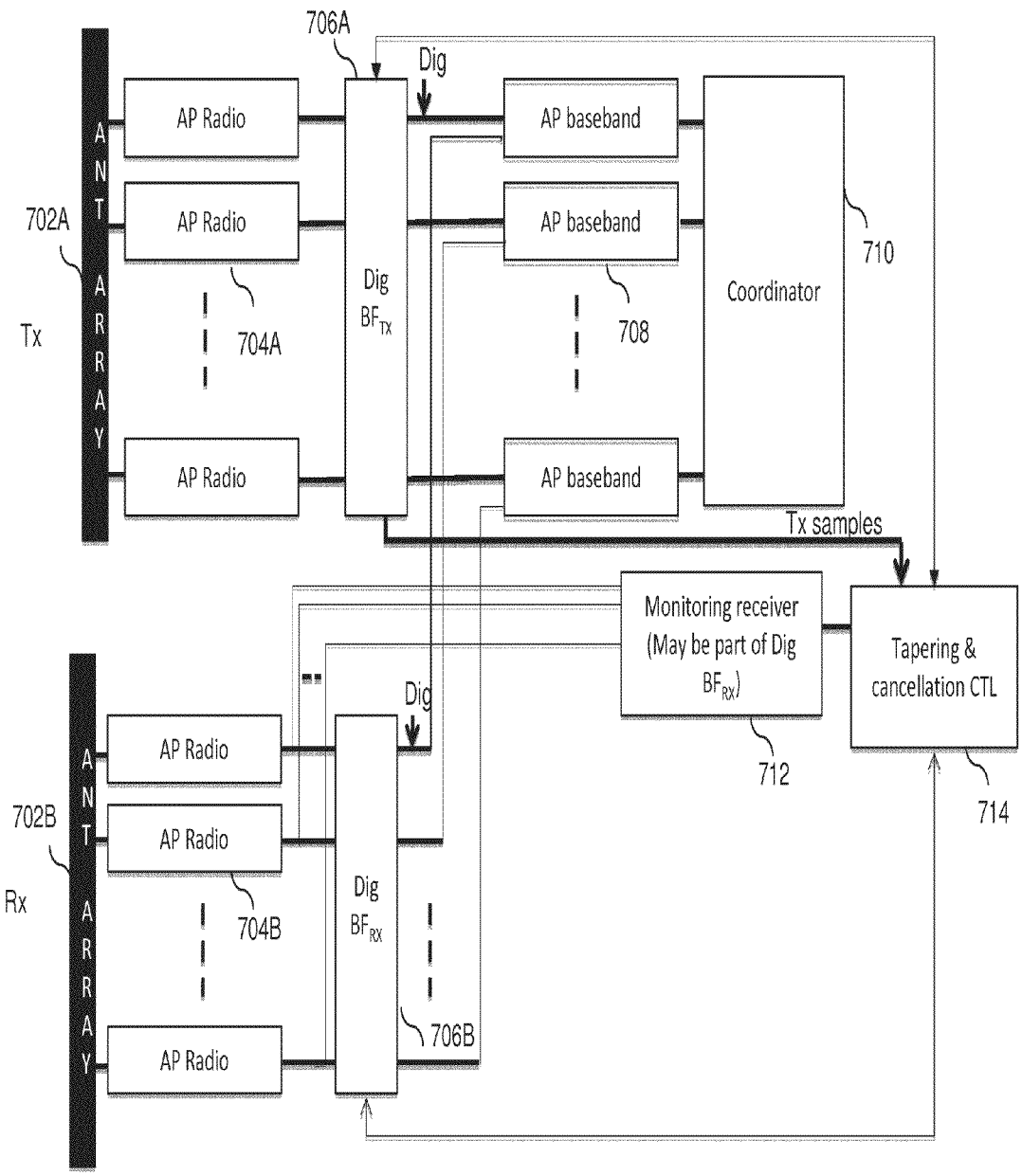
FIG. 7 describes a block diagram of digital beamforming implementing closed-loop Tx signal cancellation at RX inputs in accordance with embodiments of the present invention.

FIG. 7 describes closed loop Tx cancellation implemented for FIG. 5A although the description is similar for FIG. 5B. This architecture includes antennas array 702A, 702B radio circuitries 704A, 704B, digital beamforming module 706A, 706B baseband processors 708 a coordinator 710 a monitoring receiver 712 and a tapering and cancellation control module 714. Tx cancellation is a technique that takes a sample of a given Tx signal, and uses it to nullify or to reduce the traces of such signals, which are detected in a receiver; the Tx sample is tuned to create destructive interference with the traces of Tx detected at the Rx.

In order to achieve the required isolation between transmitting antenna arrays and the receiving antenna, some or all of the following features may be used:

Separating Receiver and Transmitter antenna by some 10 m provides some 60 dB of isolation; 1 m separation offers some 40 dB of isolation;

Wrapping both antennas structure by RF absorbing material, adds up to 5 dB of isolation;

Shaping the individual antenna elements provides some additional 20 dB of isolation for an individual antenna and some additional 10 dB of isolation for an array; and Designing the Transmitter antenna array using tapering technology can provide some 30 dB of side-lobes reduction per array.

Total isolation achievable with the above means amounts to 60+5+20+10+30=125 dB, exceeding the Required Isolation goal, provided however that close by reflections are eliminated and far away ones are sufficiently attenuated.

Figure 8:
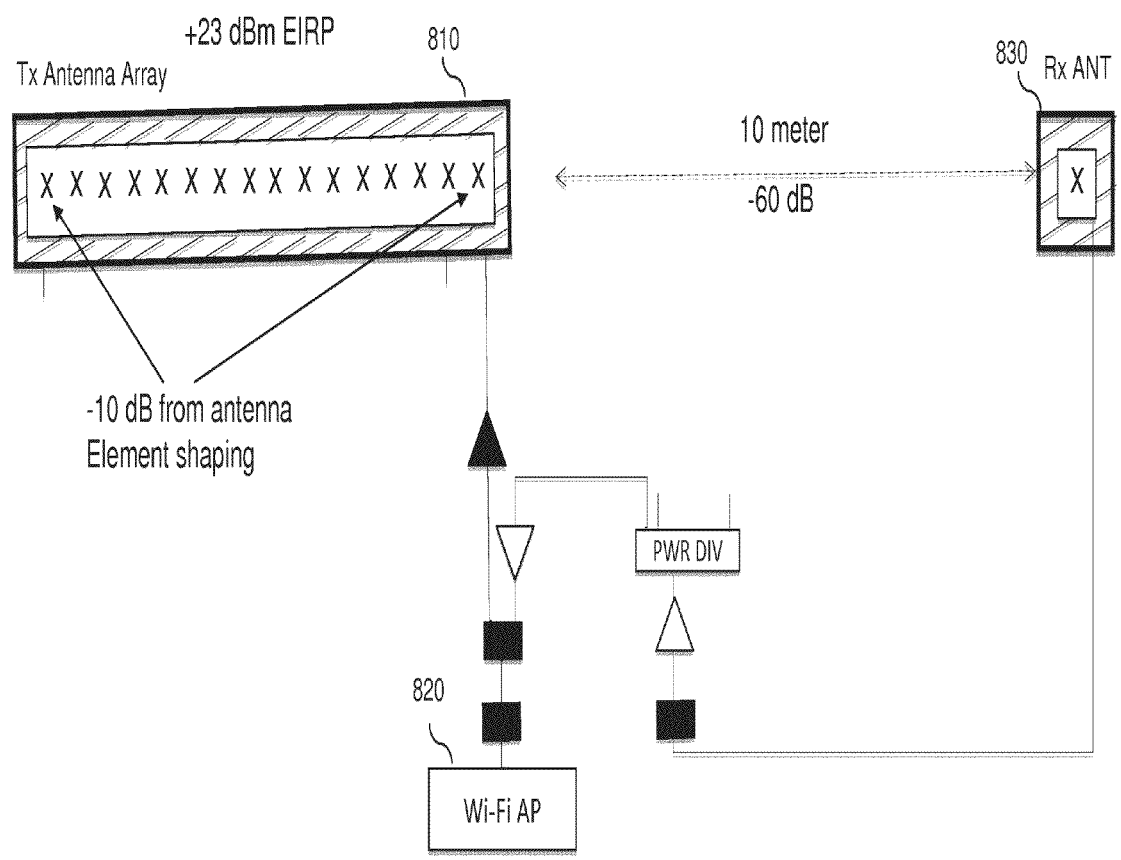
FIG. 8 is a block diagram illustrating isolation of receiver antenna and a transmitter antenna array in accordance with some embodiments of the present invention.

FIG. 8 describes isolation buildup 800 for a W-Fi AP 820 between a transmit beamforming array 810 and a receive sector antenna 830 separated by 10 m. The calculation shows 125 dB of isolation can be achieved.

According to some embodiments of the invention, the isolation is achieved by a spatial separation that attenuates the transmitted signal of the directional beams by at least 100 dB.

According to some embodiments of the invention, the receive antennas and/or the transmit antennas are positioned so that side lobes are directed to each other, wherein the antennas are designed such that said side lobes are suppressed.

Figure 9:
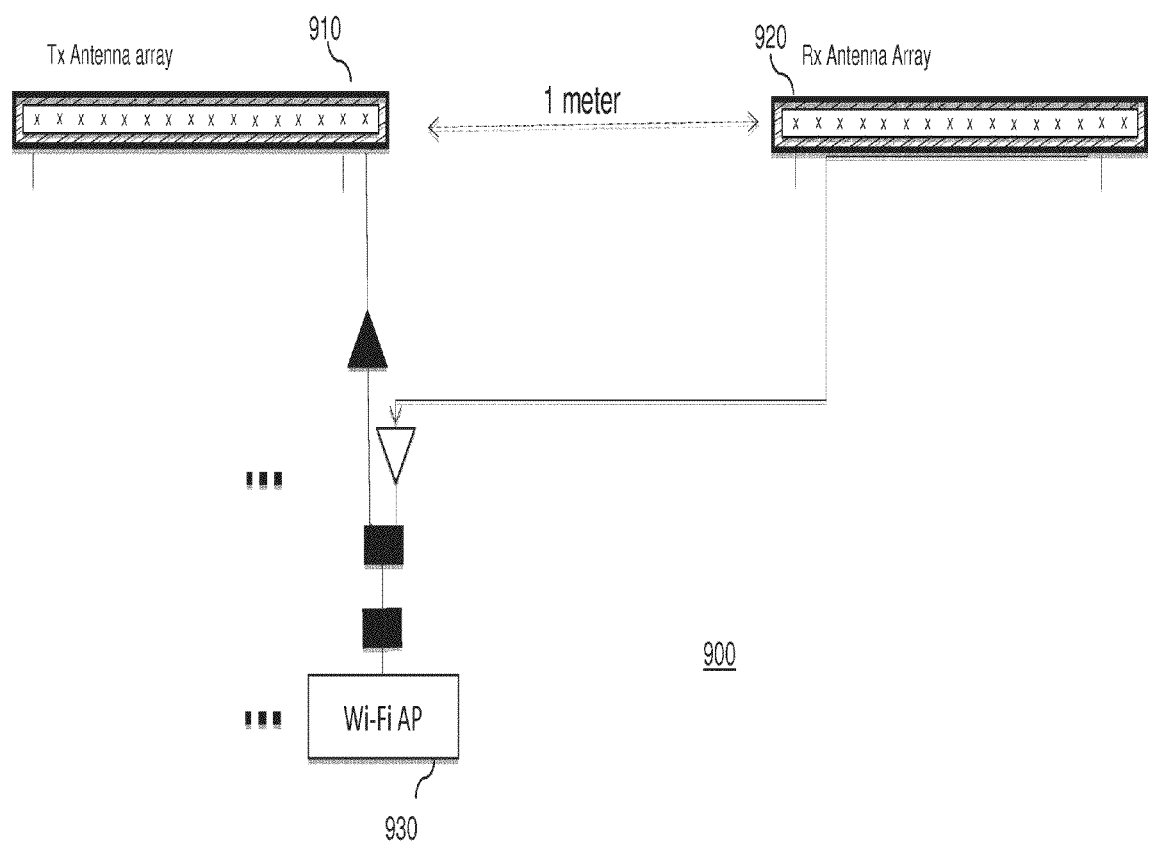
FIG. 9 is a block diagram illustrating isolation of receiver antenna and a transmitter antenna arrays in accordance with some embodiments of the present invention.

FIG. 9 describes isolation buildup 900 of a Wi-Fi AP 930 between a transmit beamforming array 910 and a receive beamforming array 920 separated by 1 m; In such a case, the reduced spacing is compensated by increased sidelobe rejection created by the second array, and the calculation is: 40+5+10+10+30+30=125 dB, showing similar achievable isolation that exceeds the Require Isolation goal.

Figure 10A:
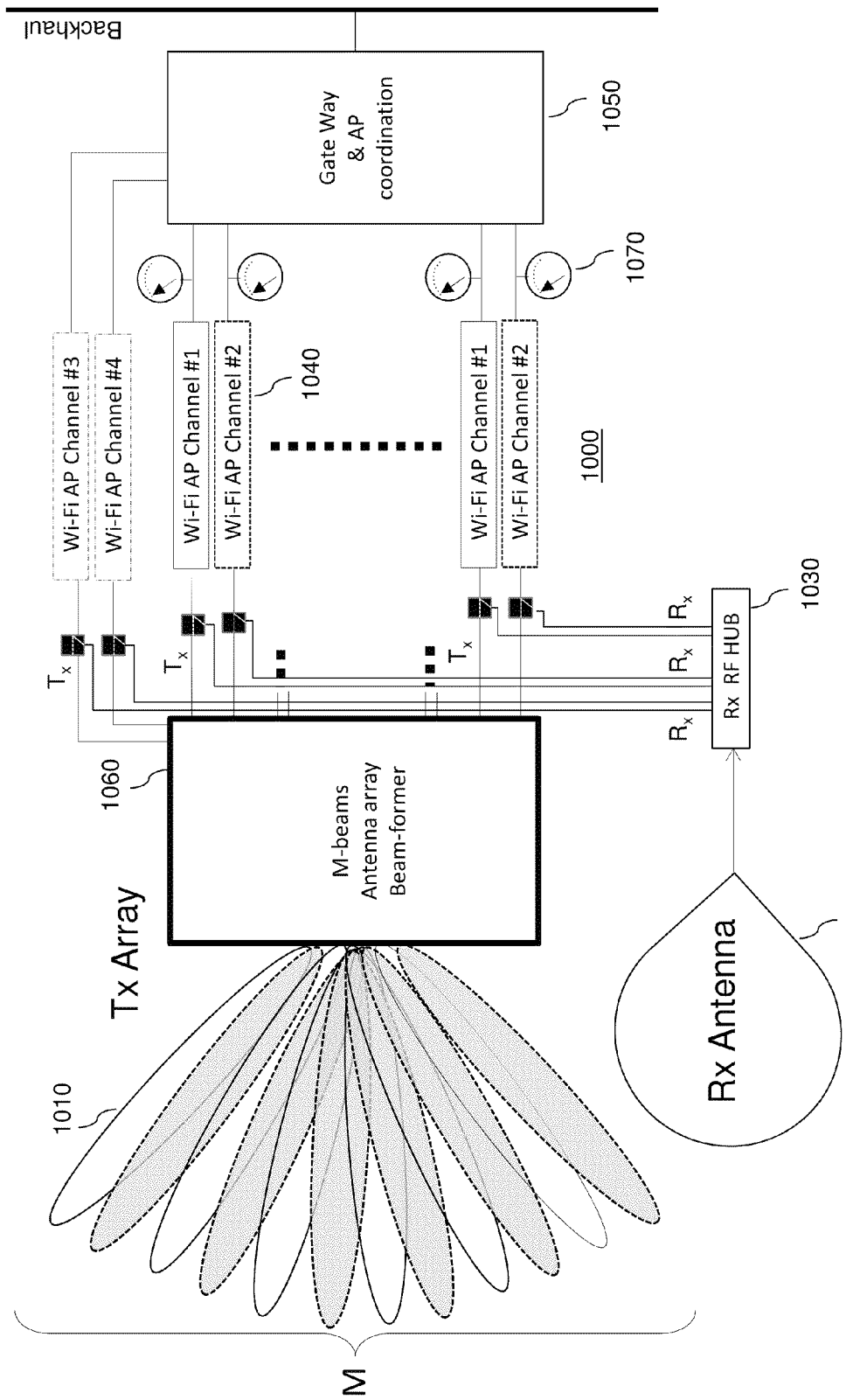
FIG. 10A is a block diagram of a multiple APs site using an Omni (or sector) antenna for receiving and a narrow beam antenna for transmitting in accordance with some embodiments of the present invention.

FIG. 10A describes a system apparatus block diagram using a multi-beam array for transmission 1010 and beamforming 1060, while the reception is done via an Omni (or a Sector) antenna 1020 that covers approximately the same azimuth and elevation angles; a legacy Wi-Fi APs' transmission output is connected to each one of the beams, while its input is fed from the Omni (or sector) antenna 1020 via an RF hub 1030. The drawing shows that more than one AP 1040 can be connected to each beam—as long as it is not using the same frequency channel. Each AP is equipped with mechanism 1070 to monitor data rate per UE, either internally, or via an external monitoring function than may be local or alternatively in higher levels of the network or application source; such monitoring may be statistical. Additionally, all APs participating in the cluster are connected to a central unit 1050 that coordinates their channels and UE allocations.

Alternatively, in some embodiments, a single AP is configured to serve some or all directional beams.

According to some embodiments, the Wi-Fi AP protocol has a basic medium contention IEEE 802.11 in which Wi-Fi devices packets are not synchronized or delayed and where a distributed coordination function is applied via at least one of: carrier sense and random back-off, for collisions avoidance.

According to some embodiments, gaps between the spatially separated beams which use a first Wi-Fi frequency channel, may be filled by an omni/sector antenna using a second Wi-Fi frequency channel whose power leakage to the first Wi-Fi frequency channel is guaranteed by the standard, to be lower than approximately −90 dBm.

Figure 10B:
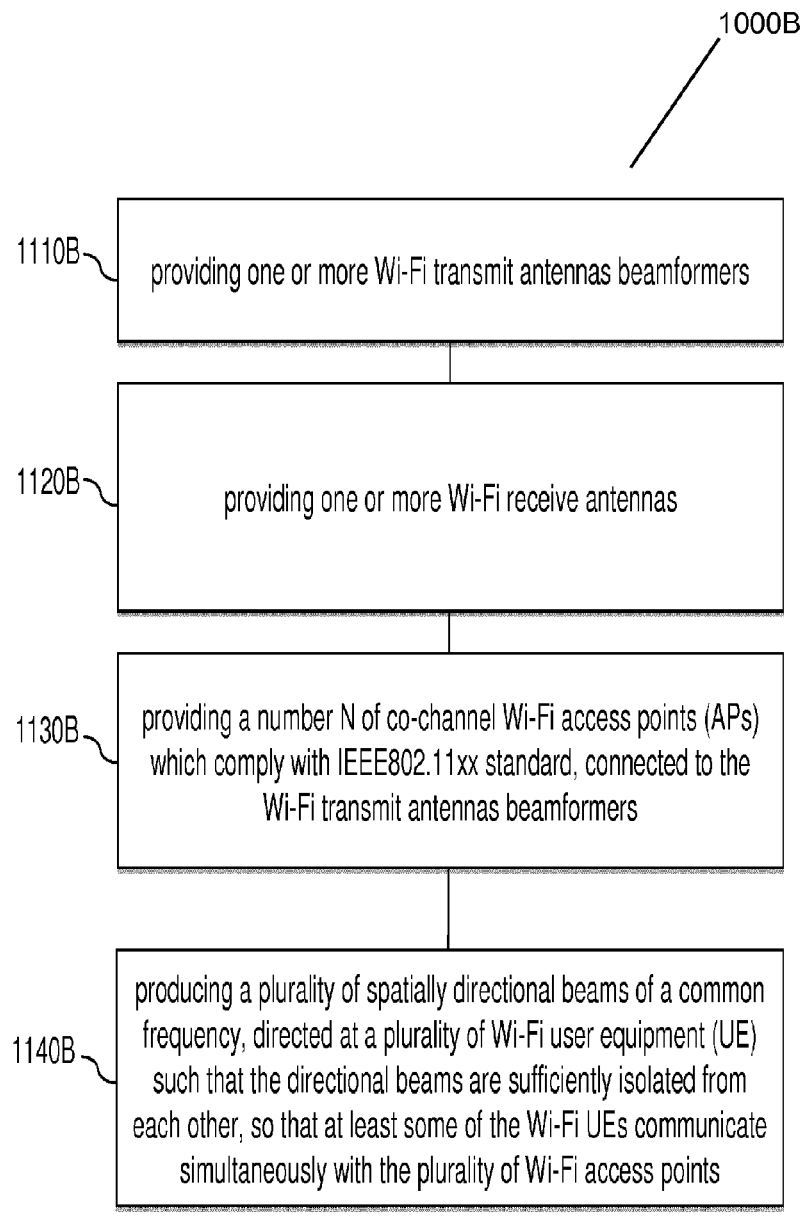
FIG. 10B is a high level flowchart illustrating a method according to some embodiments of the present invention.

The assumption in an architecture according to one embodiment is that all beams overlap each other coverage, and that every other beam is isolated from each other by some 30 dB (as measured at an antenna test range); a pair of channels is used for odd and even beams, thus enabling frequency reuse, up to N/2, where N is the number of beams. FIG. 10B is a high level flowchart illustrating a method 1000B according to some embodiments of the present invention. The method may include for example providing one or more Wi-Fi transmit antennas beamformers 1010B; providing one or more Wi-Fi receive antennas 1020B; providing a number N of co-channel Wi-Fi access points (APs) which comply with the IEEE 802.11 standard, connected to the Wi-Fi transmit antennas beamformers 1030B; and producing a plurality of spatially directional beams of a common frequency (i.e., same carrier frequency for the Wi-Fi transmitting), directed at a plurality of Wi-Fi user equipment (UE) such that the directional beams are sufficiently isolated from each other, so that at least some of the Wi-Fi UEs communicate simultaneously, concurrently or substantially at the same time with the plurality of Wi-Fi access points 1140B.

Figure 11:
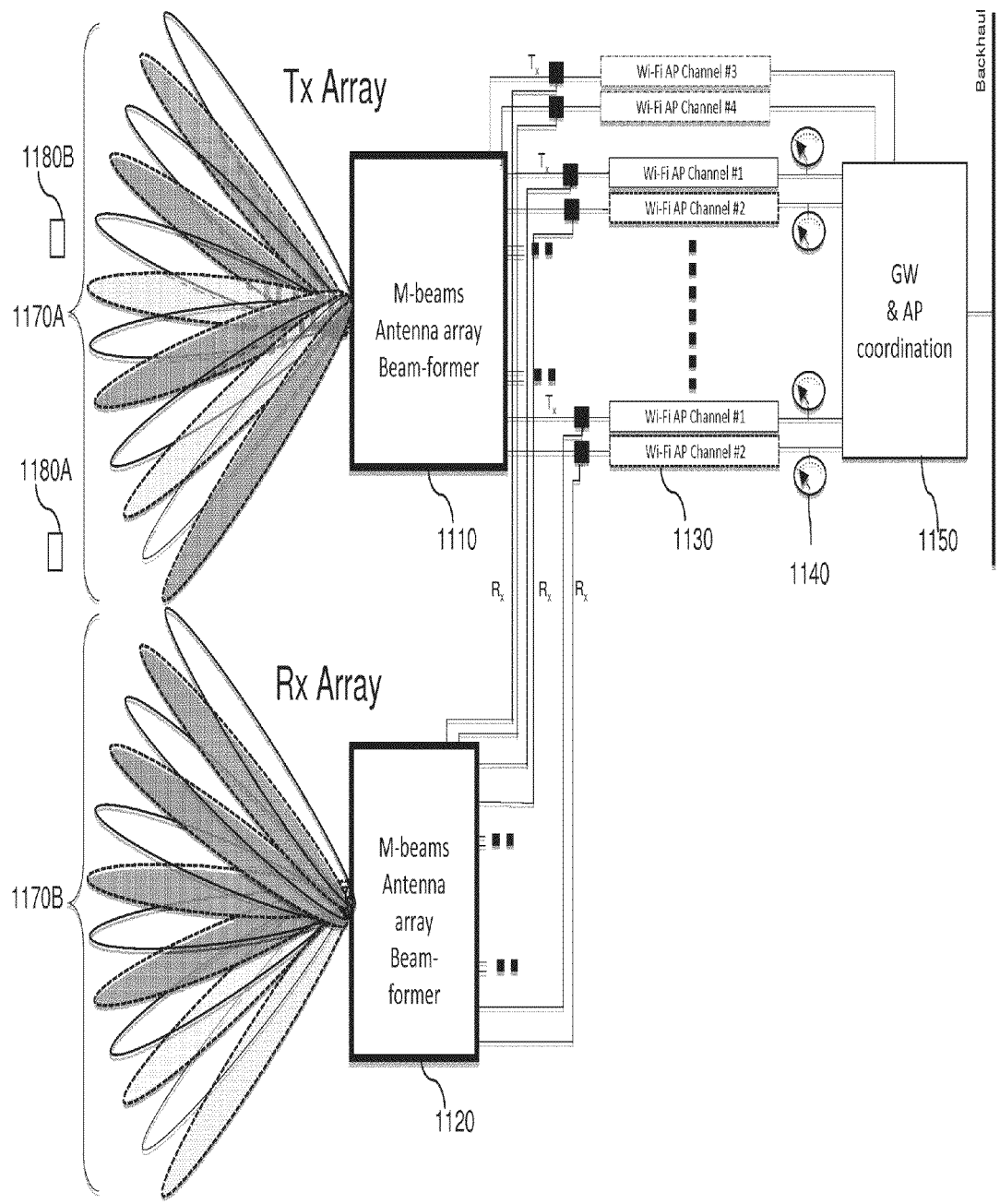
FIG. 11 is a block diagram of a multiple access points site using a first set of narrow beam antennas for transmitting, and a second set for receiving in accordance with embodiments of the present invention.

FIG. 11 is a block diagram of a system according to some embodiments of the present invention. The system may include one or more Wi-Fi transmit antennas beamformers 1110, having one or more Wi-Fi receive antennas, and a number N of co-channel Wi-Fi access points (APs) 1130 which comply with the IEEE 802.11 standard having Wi-Fi transmitters and receivers and, connected to the Wi-Fi transmit antennas beamformers and the Wi-Fi receive antennas 1120. The Wi-Fi transmit antennas beamformers 1110 are configured to produce and transmit a plurality of directional beams 1170A of a common frequency, directed at a plurality of Wi-Fi user equipment (UE) devices 1180A and 1180B such that the directional beams are sufficiently isolated from each other, so that at least some of the Wi-Fi UE devices communicate concurrently or simultaneously with the plurality of Wi-Fi APS via directional receive beams 1070B and receive antennas or beamformers 1120. UE devices may be any Wi-Fi enabled end user devices such as cellular phones, tablet PC, laptop computers, hand held devices and the like.

The multi-beam antenna arrays, covering approximately the same azimuth and elevation angles, use one array for receiving 1120 and the other for transmitting 1110 of each AP 1130. The use of multi-beam on both Transmitter and Receiver, enhances overall capacity not only over uplink, but also for downlink, as the less APs' receivers can detect transmissions of out-of-beam co-channel UE devices, the less they are inhibited from transmitting at will.

Each AP 1030 is equipped with mechanism 1040 to monitor data rate per UE, either internally, or via an external monitoring function that may be local or alternatively in higher levels of the network or application source; such monitoring may be statistical. Additionally, all APs participating in the cluster are connected to a local central unit 1050 that coordinates their channels and UE allocations.

Additional value of using a multi-beam array for Receiver, is the ability to select adjacent beams for the reception of UEs that are otherwise blocked by neighboring beam's UEs; similarly, individual APs may attenuate their sensitivity without violating the standard requirement (as long as their receiving sensitivity+Antenna gain meet−90 dBm) thus reducing collisions with out-of-beam UEs.

According to some embodiments, the N co-channel Wi-Fi transmitters are sufficiently isolated from their N respective receivers such that the transmission power received by N−1 of the N co-channel Wi-Fi transmitters is lower than a white Gaussian noise present in the N respective receivers.

According to some embodiments, the receivers and the transmitters are sufficiently spatially separated from each other so that the transmission power decays to a level of a white Gaussian noise.

According to some embodiments, the isolation is achieved by the spatial separation is at least 100 dB. Specifically, the receive antennas and/or the transmit antennas are positioned in a way that direct side lobes to each other. Alternatively, the antennas are designed such that said side lobes are suppressed.

According to some embodiments, traces of transmitted signals originated from said access points and detected at its receiving circuitry, are fed into a cancellation process in which samples of the original transmitted signals are subtracted from said traces, in order to nullify or at least reduce them.

Figure 12:
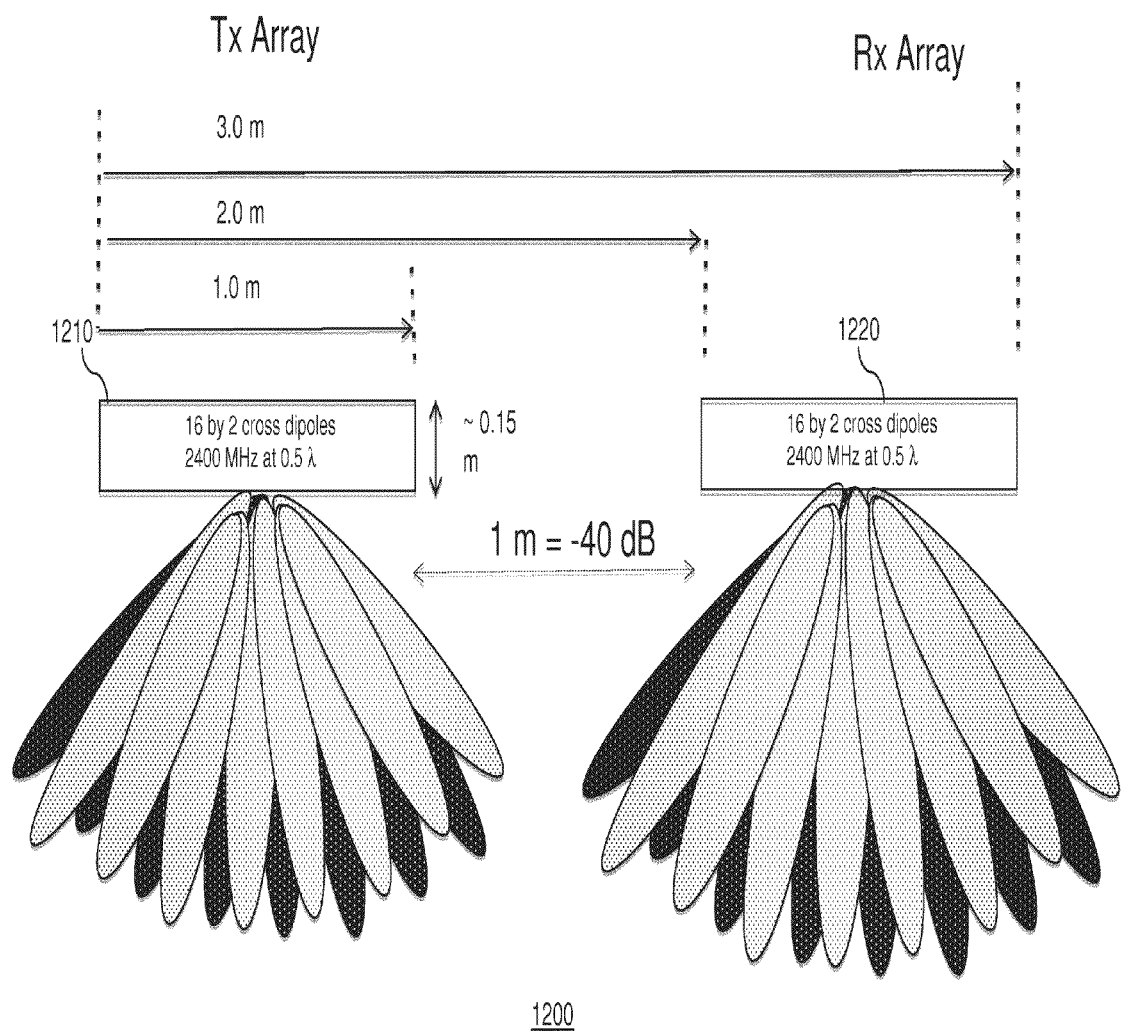
FIG. 12 illustrates installation of Tx and Rx array according to one embodiment.
Figure 13:
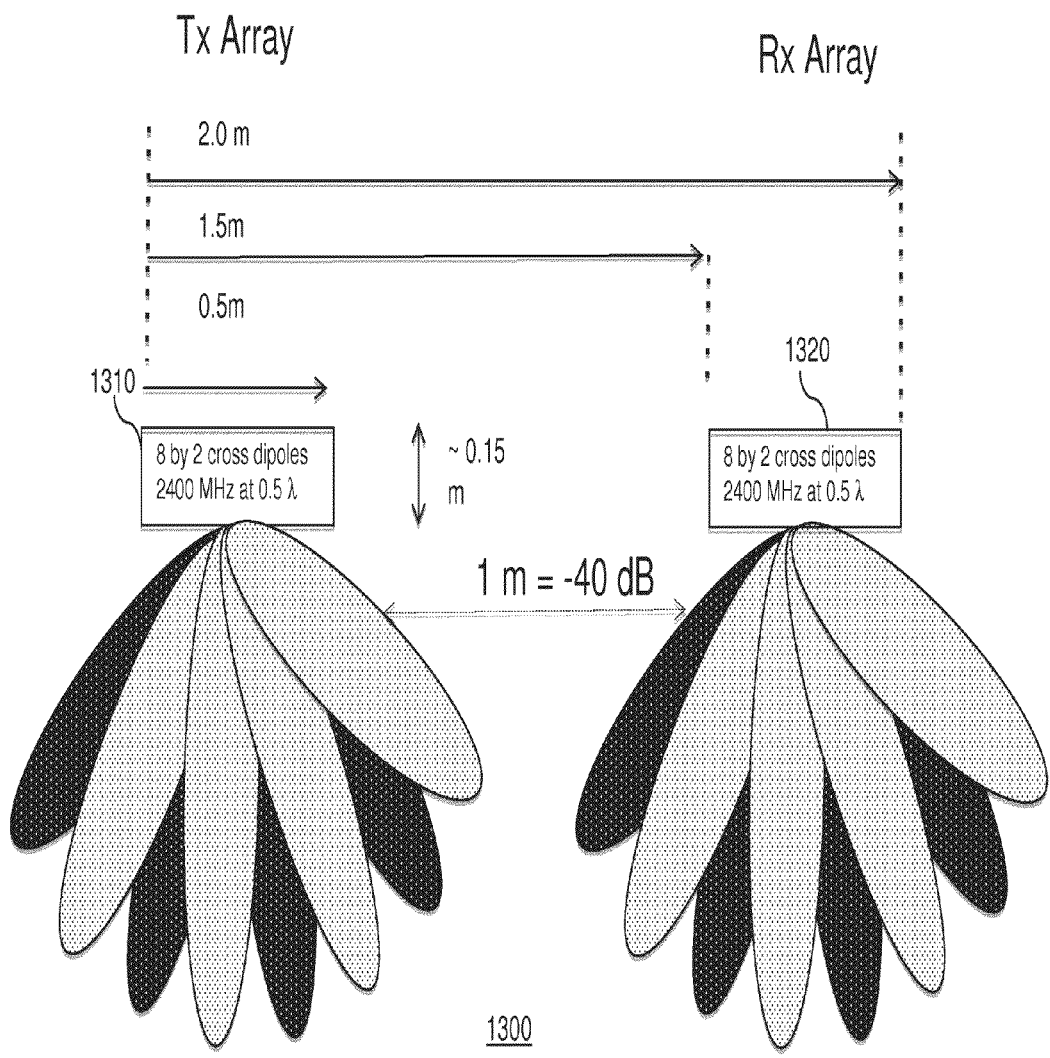
FIG. 13 illustrates installation of Tx and Rx array according to another embodiment.

FIG. 12, 13 describes example of mounting layout of two arrays showing a first layout 1200 illustrating a transmit beamformer array 1210 and receive beamformer array 1220 and a second layout 1300 illustrating a transmit beamformer array 1310 and receive beamformer array 1320.

Figure 14:
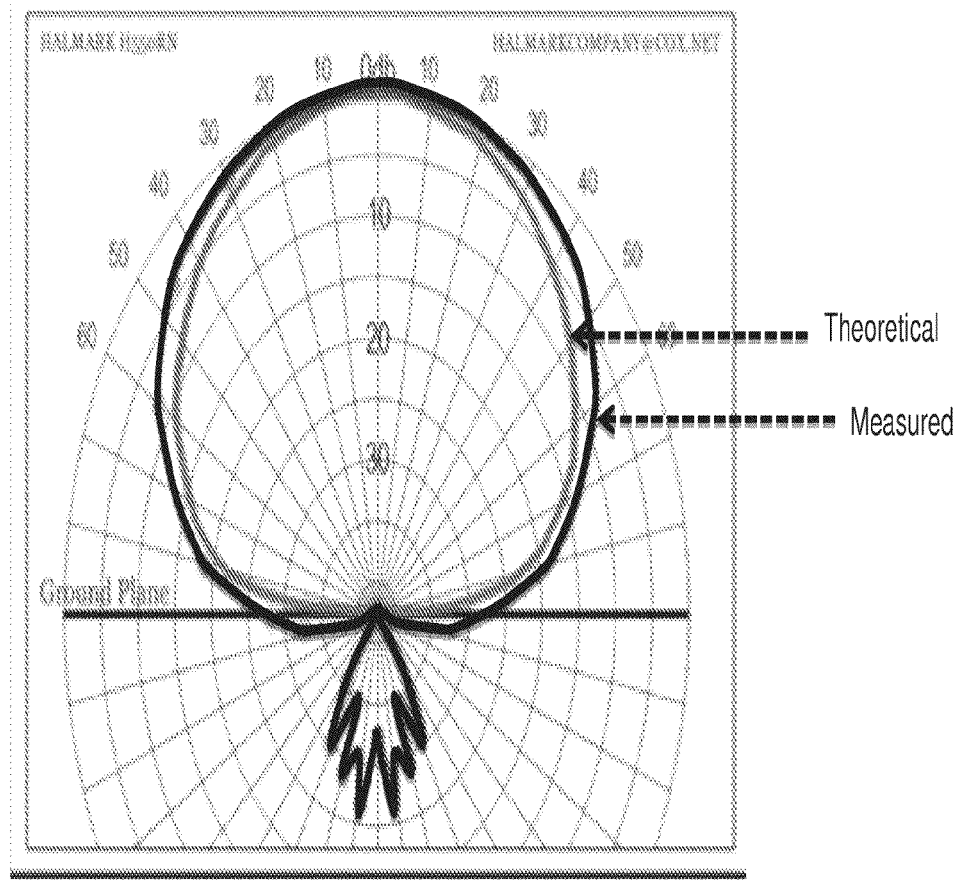
FIG. 14 describes an antenna element that can be used for a multi-element antenna array in accordance with embodiments of the present invention.

FIG. 14 describes a beam pattern diagram 1400 of a possible antenna element that can be used to build such an antenna array; it outlines a radiation pattern of a patch antenna over ground plane, which has a main lobe pointing towards some bore sight, lower radiation level at +/−90° (which serves the purpose of increasing isolation toward other antennas installed alongside), and back lobes.

Figure 15:
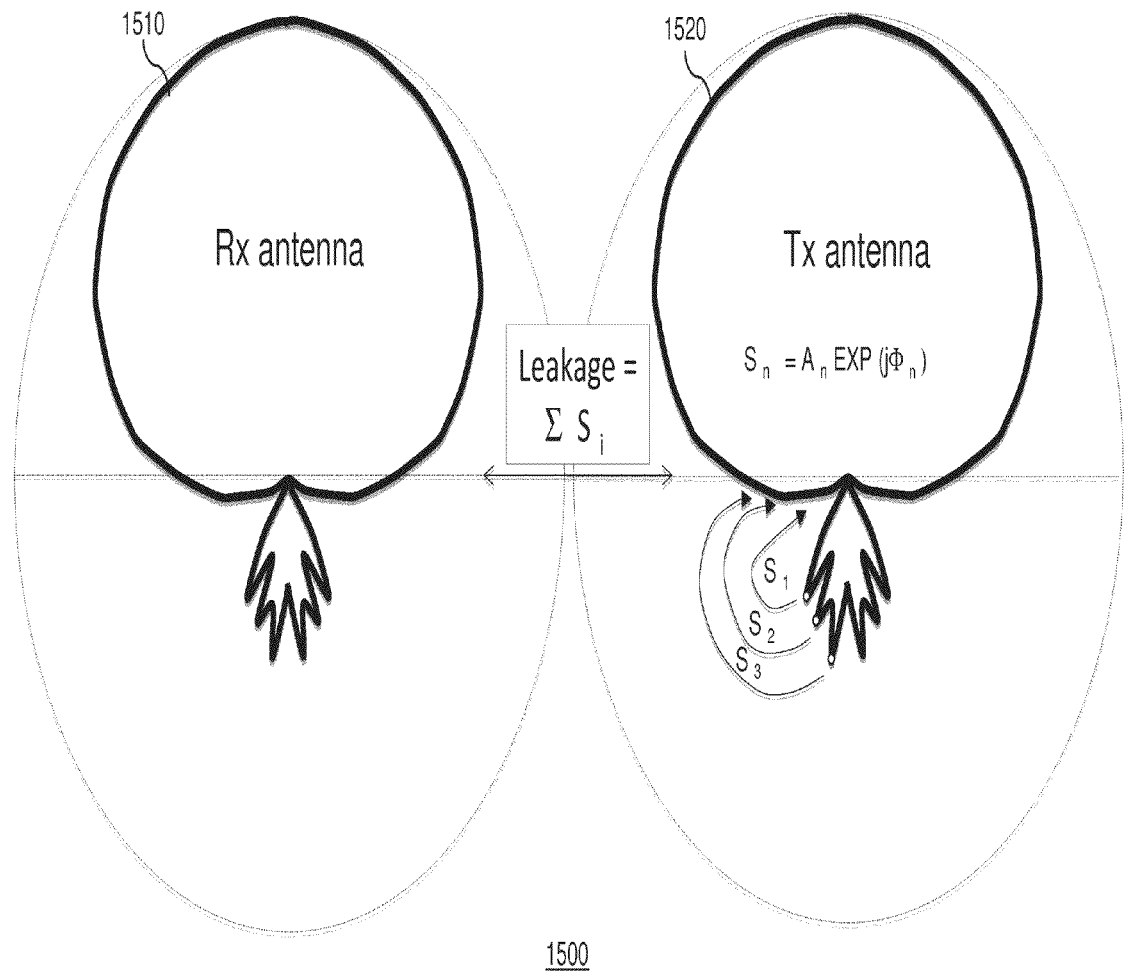
FIG. 15 illustrates two proximal antenna elements cross talk.

FIG. 15 is a beam pattern diagram 1500 illustrating the parasitic impact of back lobes and 90° side lobes which creates crosstalk between a receiving and a transmitting antennas that are virtually co-located; it also indicates that such contributors are coherently combined, so that they provide a single vector equal to $\Sigma\, S_i$ which lends itself to cancellation or reduction of transmission traces detected at receiving circuits of the APs.

Figure 16:
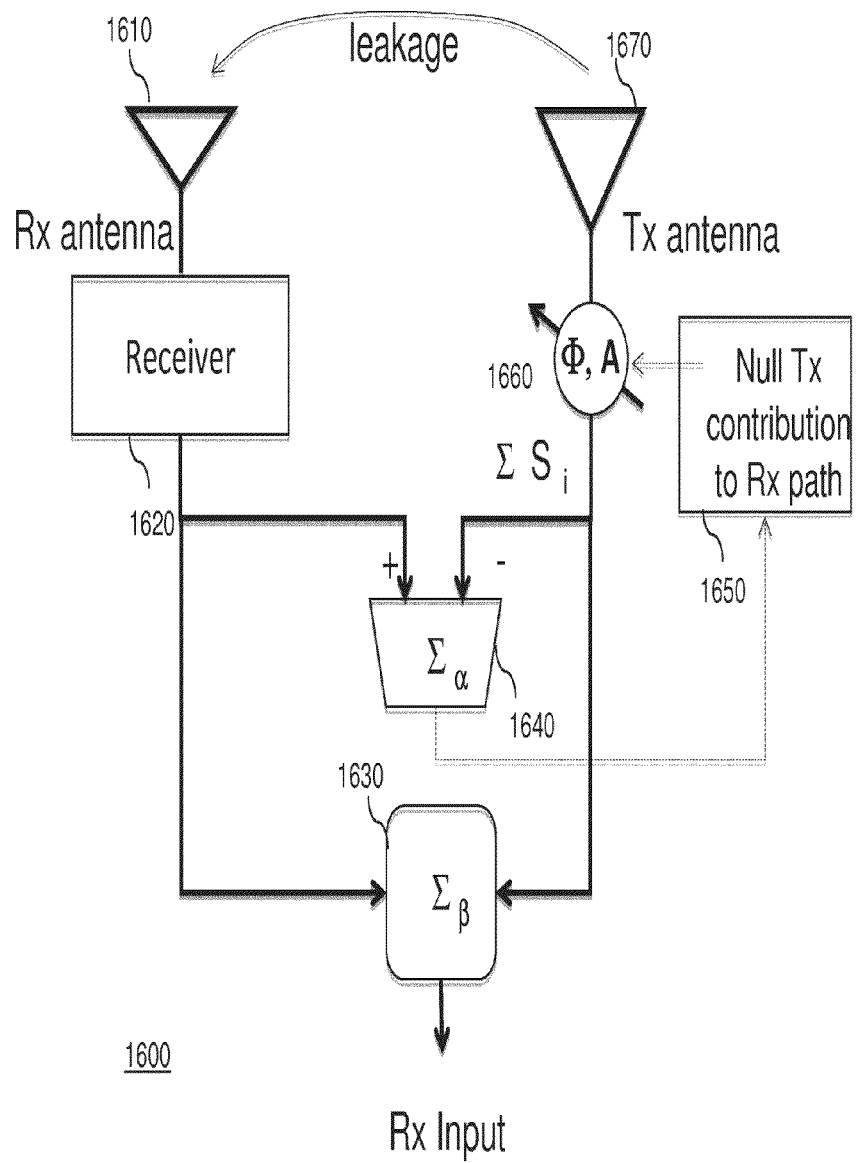
FIG. 16 illustrates cancellation circuit for elimination or reduction of cross talk between two antennas.

FIG. 16 describes a circuit 1600 that implements cancellation of Tx components found in the Rx receiver 1620 connected to receive antennas 1610; Cancellation is carried out by a combination of nulling module 1650, summation modules 1630 and 1640 and phase sifter/gain control module 1660. Such cancellation between 2 antennas can be done with a single circuit per antenna pair (for a given frequency) due to the coherency of the summation of all participating sources of leakage. It should be noted that $\Sigma_\alpha$ a is used at off line calibration and $\Sigma_\beta$ is used during operation.

According to some embodiments of the invention, the tapering is carried out by monitoring traces of transmitted signals originated from said APs, and manipulating antennas weights to reduce said traces, and wherein said traces are fed or input into a cancellation process in which samples of the original signal are subtracted from said traces.

Figure 17:
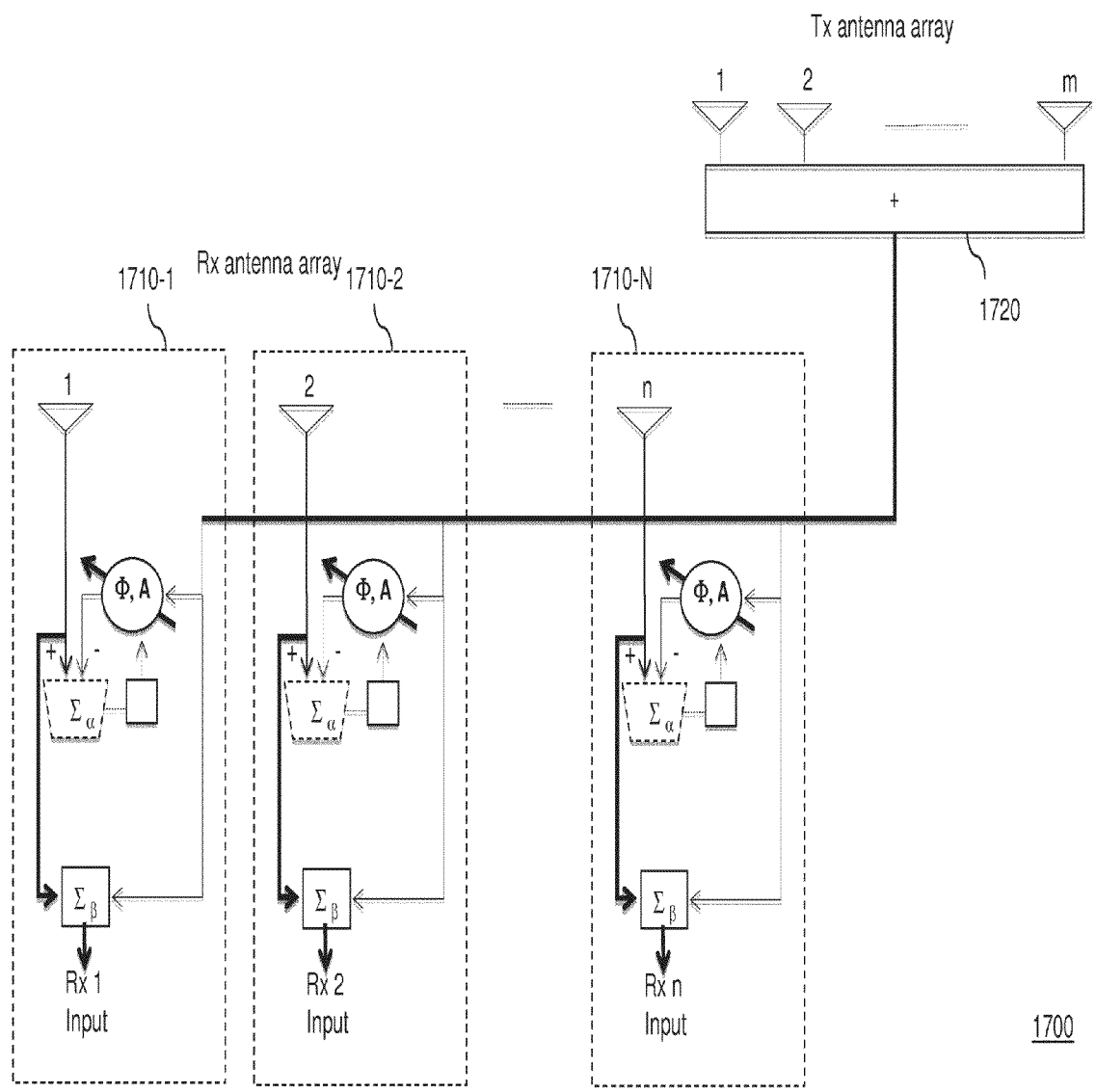
FIG. 17 illustrates cancellation circuit for elimination or reduction of cross talk between two antenna arrays in accordance with embodiments of the present invention.

FIG. 17 describes a circuit 1700 that implements cancellation of Tx for an entire array, element by element based on the same characteristic of the coherency of all participating sources of leakage It is noted that a separate cancellation circuit 1710-1 ... 1710-N is required per each Tx beam in the transmit beamformer array 1720. Also noted that the cancellation is done with support of a closed loop mechanism, by monitoring the cancellation success at the receivers' inputs.

In yet another embodiment, such wide band cancellation or reduction can be performed via wide band cancellation methods e.g. using Finite Impulse Response (FIR) filtering.

When performing Tx cancellation during real time operation—rather than only at factory and on installation—gaps in transmission of UEs and neighboring APs should be detected; when available, Tx beams should be turned on one-by-one for the calibration/tuning process.

Figure 18:
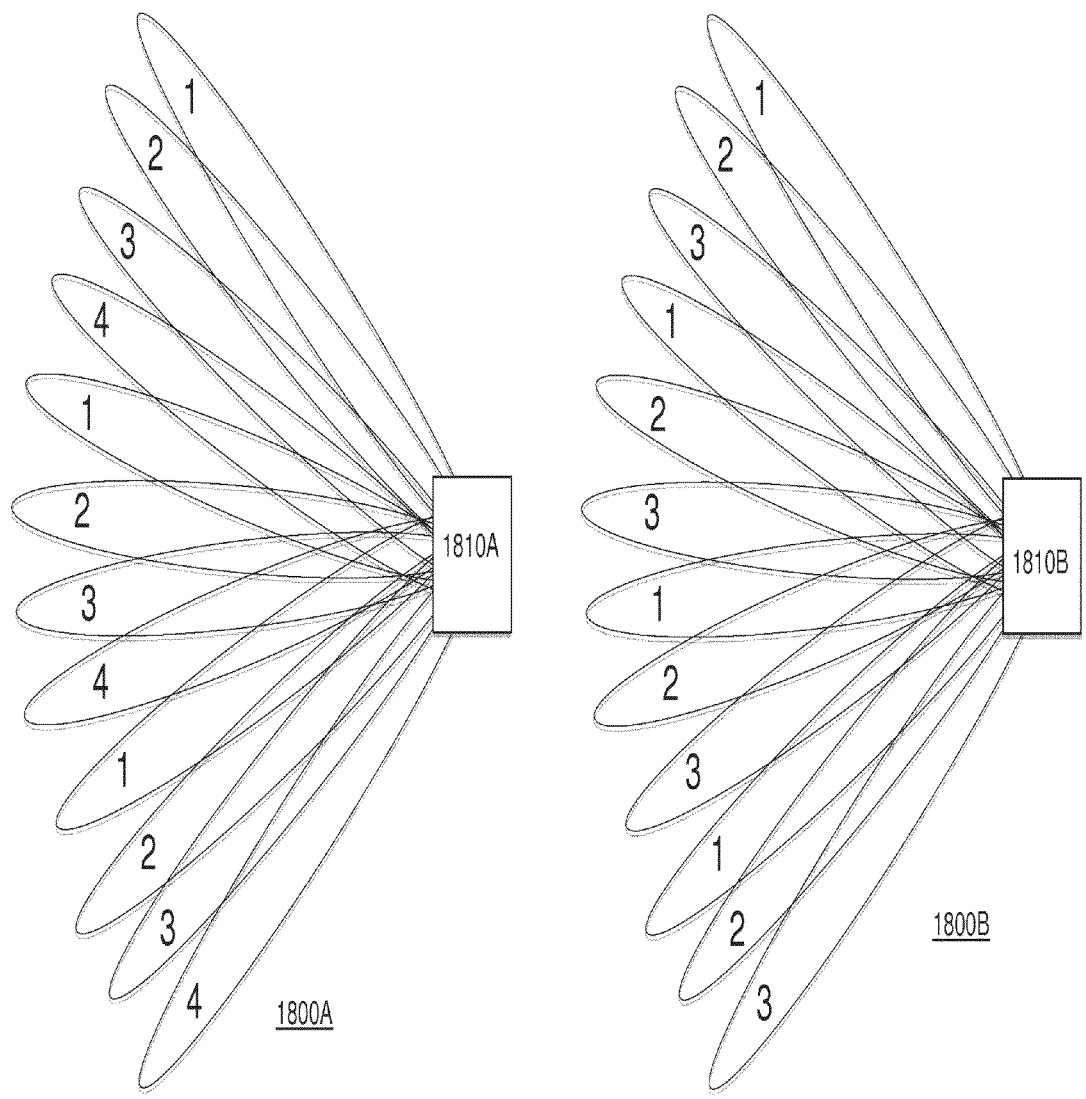
FIG. 18 is yet an alternative of channel allocations to consecutive beams in accordance with some embodiments of the present invention in accordance with embodiments of the present invention.

FIG. 18 describes two cases 1800A and 1800B where channel allocations per beam uses more than two channels for each Wi-Fi station 1810A and 1810B respectively.

According to some embodiments, the coordinator initiates a handover of a UEs (a victim UE) which is affected by multipath coming from some reflector illuminated by another co-channel beam (the victimizer beam); such a handover may be toward either a the very same victimizing beam—if SINR is sufficient, or towards another lower interference available beam. Such multipath generated leakage amongst co-channel beams are referred to as Cross Talk.

According to some embodiments, the coordinator reports the crosstalk table to the both victim UEs and victimizing beams and the scheduler of both access points performs a coordination that facilitates time sharing when victim UEs are served. According to some embodiments, the Wi-Fi APs channels are associated with at least two frequencies.

Figure 19:
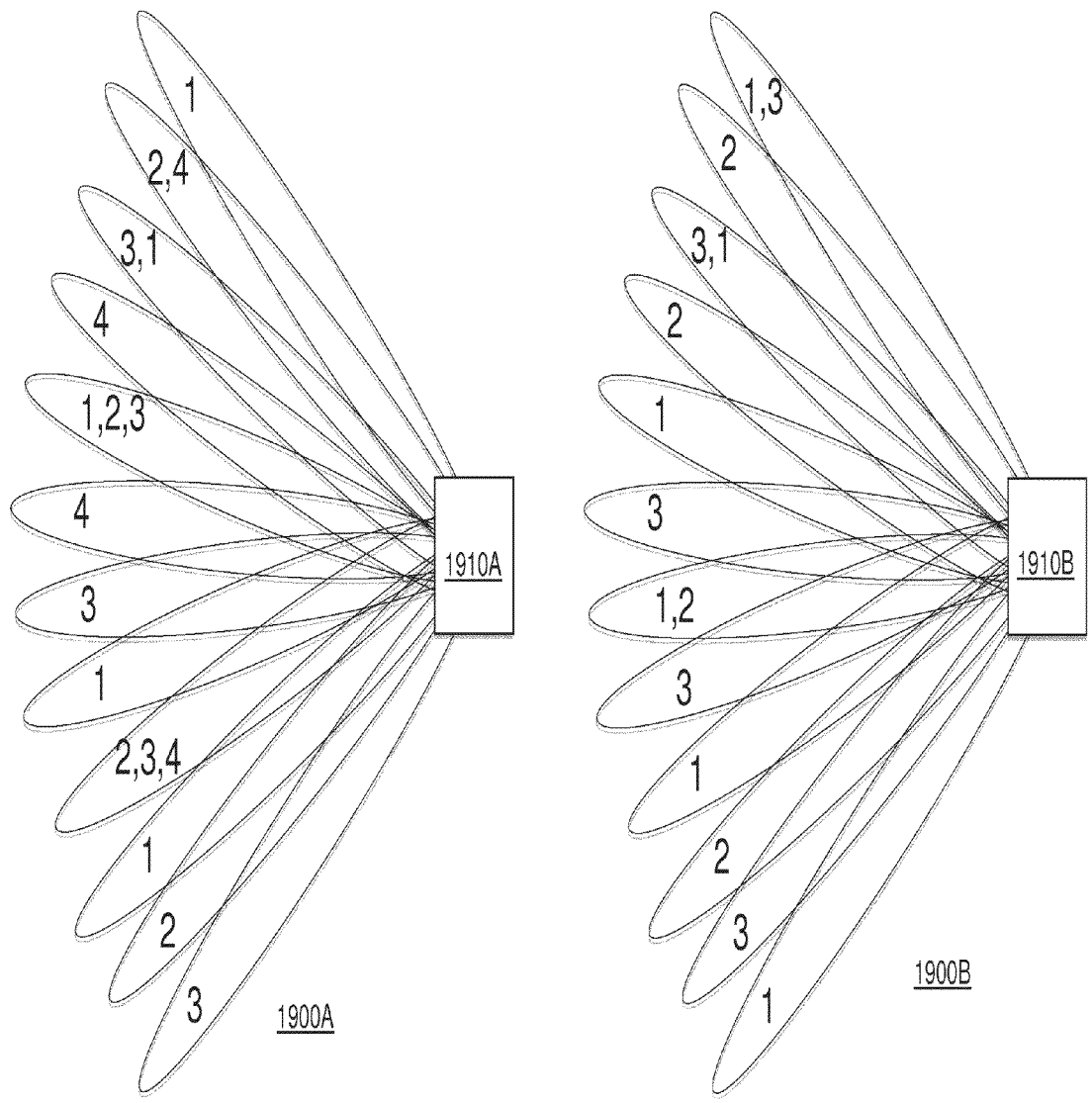
FIG. 19 illustrates example of feeding several channels to a beam in accordance with some embodiments of the present invention.

FIG. 19 describes cases 1900A and 1900B where more than one channel is feeding one beam for the Wi-Fi station 1910A or 1910B. According to some embodiments, coverage gaps between the set of spatially separated beams which use a first Wi-Fi frequency channel, are filled by the other set of spatially separated beams which use a second Wi-Fi frequency channel.

According to some embodiments, the one or more Wi-Fi receive antennas are implemented as one or more beam-formed array of antennas.

According to some embodiments, the systems further includes a gateway and access point coordinator configured to instruct the beamformers to spatially manipulate the beams, based on data received from the Wi-Fi UEs, so as to maintain the sufficient isolation between the beams, over time.

According to some embodiments, side lobes of at least one of the beams are reduced to a level of approximately 30 dB below their peak. This may be implemented by means of both mathematical calculations and closed loop tapering. In one embodiment weights setting may be based on feedback from UEs or from calibration transmitters located at various points throughout the cell's coverage area FIG. 20 describes the isolation issue from the uplink point of view: while the intensive isolation created between Tx and Rx of APs, guarantees $AP_i$'s transmission will not prohibit $AP_j$ from transmitting, the transmission originated from a close by Wi-Fi Station served by $AP_i$, may be received by $AP_j$'s receiver, and blocks its transmission.

To illustrate the issue, assume two Stations 2020 and 2030 served by beam 2010 which represents both receiving and transmitting beams, and Station 2050 served by beam 2040; UEs 2030 & 2050 can be served concurrently or simultaneously and independently by their respective serving beams 2010 & 2040. However, while beam 2010 is serving UE 2020, its uplink transmission is received by the AP receiver of the non serving beam 2050, causing the AP of beam 2050 to yield and refrain from serving UEs in its coverage.

The aforementioned blocking happens due to the fact that side lobes level are some 30 dB below the peak (rather than a desired 100 dB); this fact causes a division of the Cell 2000 into 2 zones: the last 30 dB of the range, and the rest of the cell, where the former being a region where Stations uplink will not block other beam's downlink, and the latter being a region when probability of mutual blocking of uplinks in different co-channel beams is high.

As cell edge is defined at SINR of some 8 dB while desired SINR is some 20 dB, then the "clean range" is assumed to be 12 dB lower i.e. 18 dB.

Figure 20:
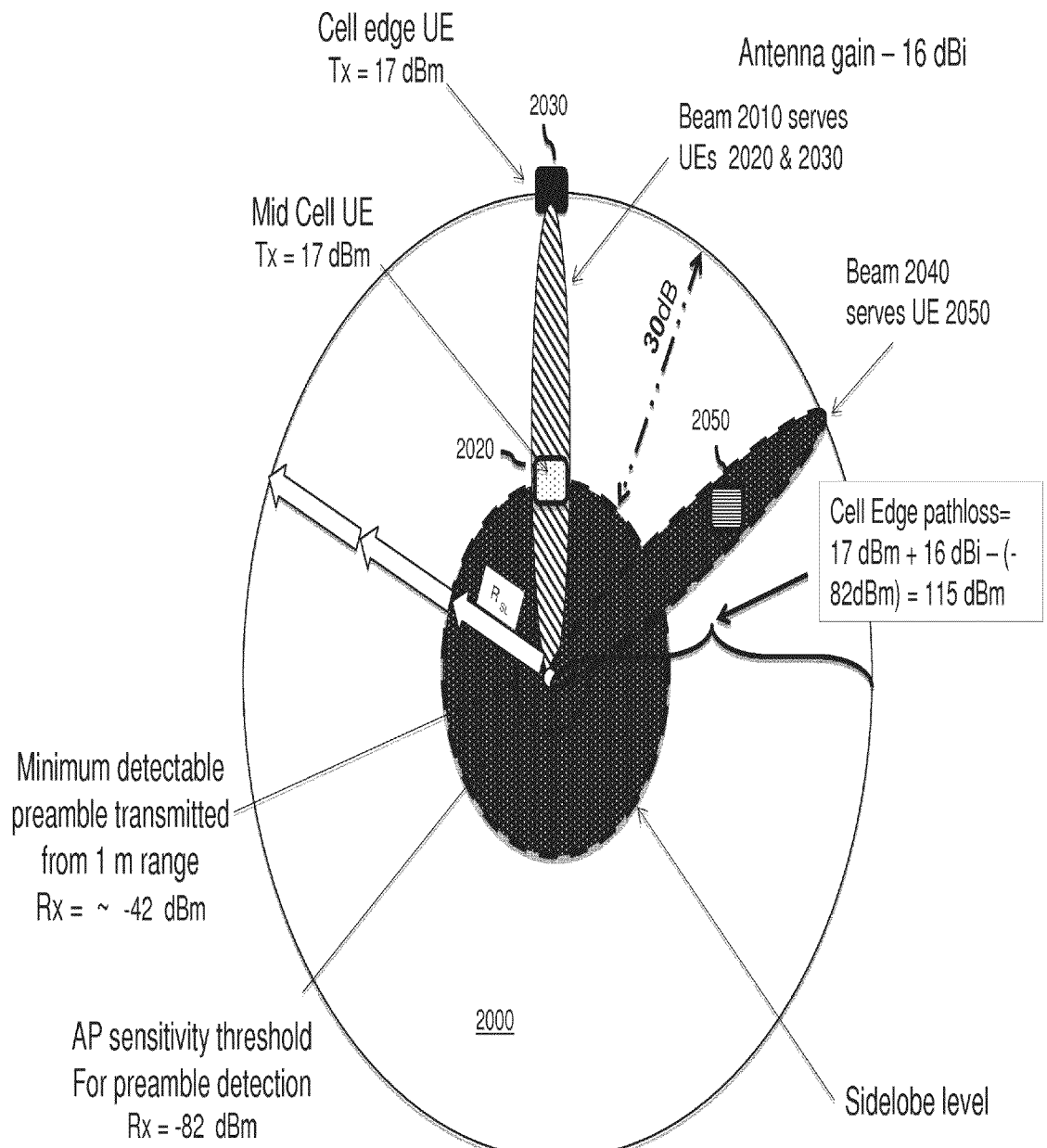
FIG. 20 illustrates Cell area where the AP cluster's Rx beams sidelobe-rejection permits capacity multiplication in accordance with embodiments of the present invention.

Assuming urban propagation factor of $\gamma$=3.7, then 18 dB constitutes:

$R_{cell\ edge}/R_{side\ lobe\ level}$=3; indeed, FIG. 20 exhibits $R_{SL}$ radius that is ⅓ of the radius to the Cell edge; the area covered by the side lobes is (⅓)^2=⅑=11% of the Cell's area. Further assumptions are: Minimum detectable preamble transmitted from 1 m range; Rx=~−42 dBm; AP sensitivity threshold For preamble detection Rx=−82 dBm; and Cell Edge path loss=17 dBm+16 dBi−(−82 dBm)=115 dBm.

FIG. 20 demonstrates that by creating −30 dB side lobes and proper tuning of the power to fit the required cell edge, capacity multiplication will preside at some 89% of the Cell's area.

According to some embodiments, a coordinator residing in the hub or in the gateway which serves the cluster of APs, performs traffic analysis and consequently executes load sharing between adjacent beams by forcing UEs handover per the requirement of load balancing.

According to some embodiments, the forcing of the UEs handover between beams is carried out via Extended Service Set (ESS)—if UEs are support ESS, or via denial of service to a given UE at a given beam.

According to some embodiments, cross talk between co-channel beams is periodically estimated using UEs estimation of alternative or neighboring APs, and the relative power of such neighbors versus the serving AP is reported by the UE to the access point, to be reported to the coordinator, generating for each UE crosstalk values originated by N−1 co-channel beams.

Figure 21:
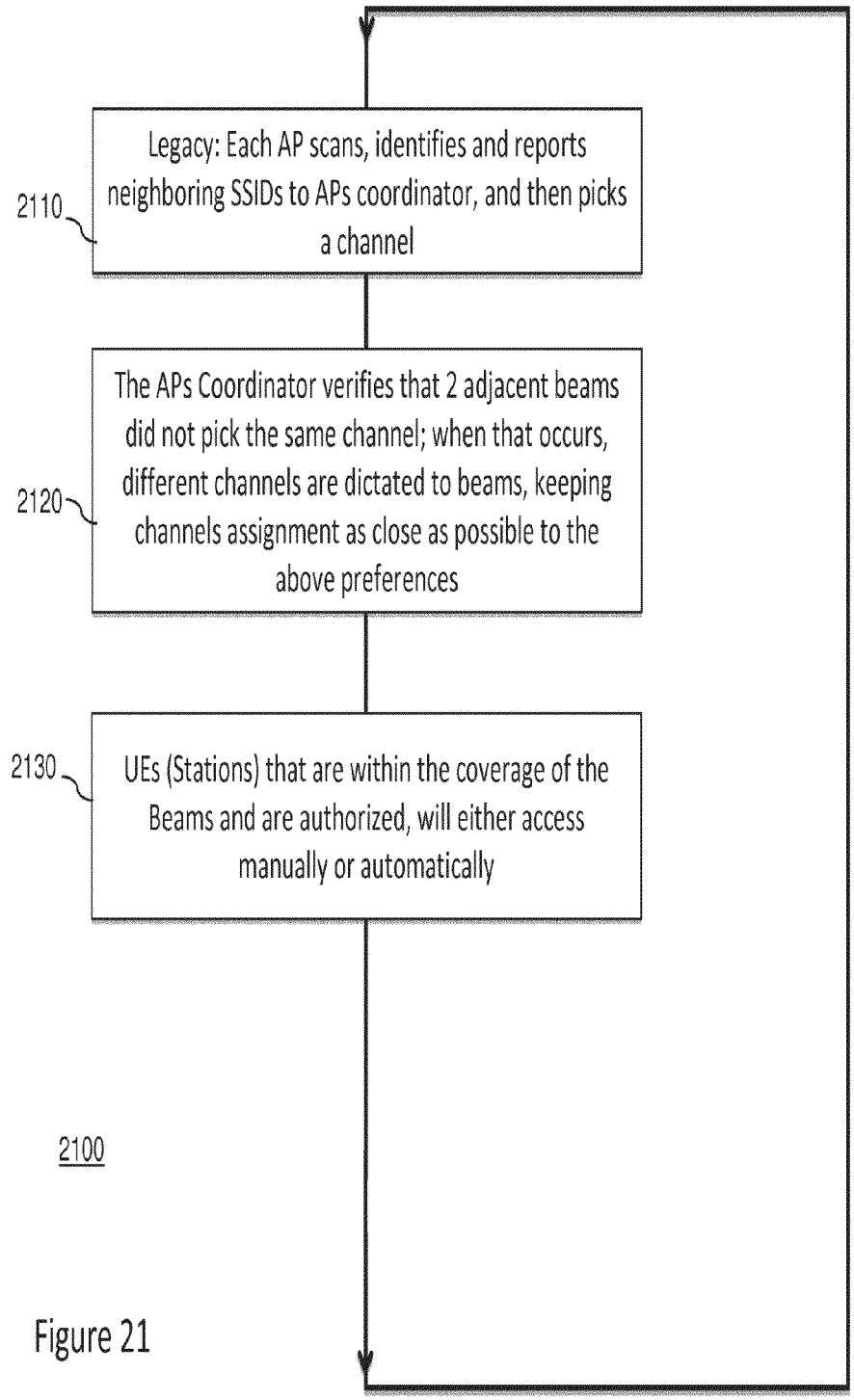
FIG. 21 is a flowchart illustrating initial operation—selecting transmit channels per beam in accordance with some embodiments of the present invention.

FIG. 21 describes a method 2100 for commissioning of such a Multi-Beam MIMO Wi-Fi base station which is deployed into and environment that is already served or partially served by residential or commercial APs. While following legacy procedures of channels selections 2110, the said Multi-Beam base station has to allocate different channels to adjacent beams even if those are not first choices of the legacy procedure, this is followed up by verification stage 2120 and authorization stage 2130 as illustrated.

Figure 22:
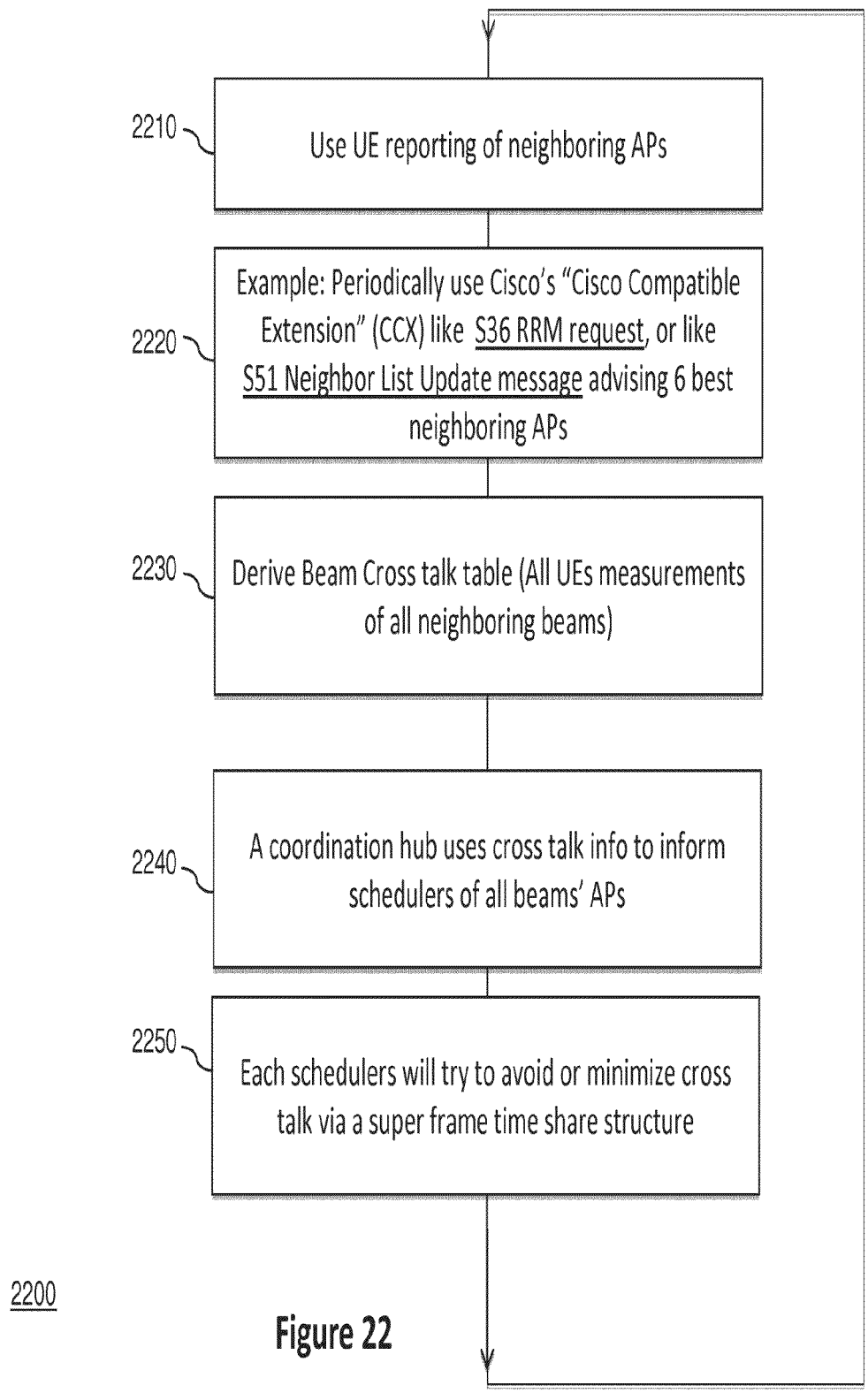
FIG. 22 is a flowchart illustrating estimating beams crosstalk in accordance with some embodiments of the present invention.

FIG. 22 describes a method 2200 using a prior art roaming procedure's Radio-Resources-Management (RRM) to pool UEs' neighbors reports about their neighboring service set identifier (SSIDs). such information used to expose neighboring beams that create crosstalk to a given UE, which is a useful information in allocating UE to optional beams (i.e. use such information to try to reallocate a given UE to a beam that does not produce crosstalk to it). Method 2200 may include for example using UE reporting of neighboring APs 2210. For example, this may be carried out by periodically using Cisco's "Cisco Compatible Extension" (CCX) like S36 RRM request, or like S51 Neighbor List Update message advising 6 best neighboring APs 2220. The method then goes on to deriveBeam Cross talk table (All UEs measurements of all neighboring beams) 2230. Then, a coordination hub uses cross talk information to inform schedulers of all beams' APs 2240. The method then goes on to a step in which each schedulers will try to avoid or minimize cross talk via a super frame time share structure 2250 and back to the step of using UE reporting of neighboring APs 2210.

Figure 23:
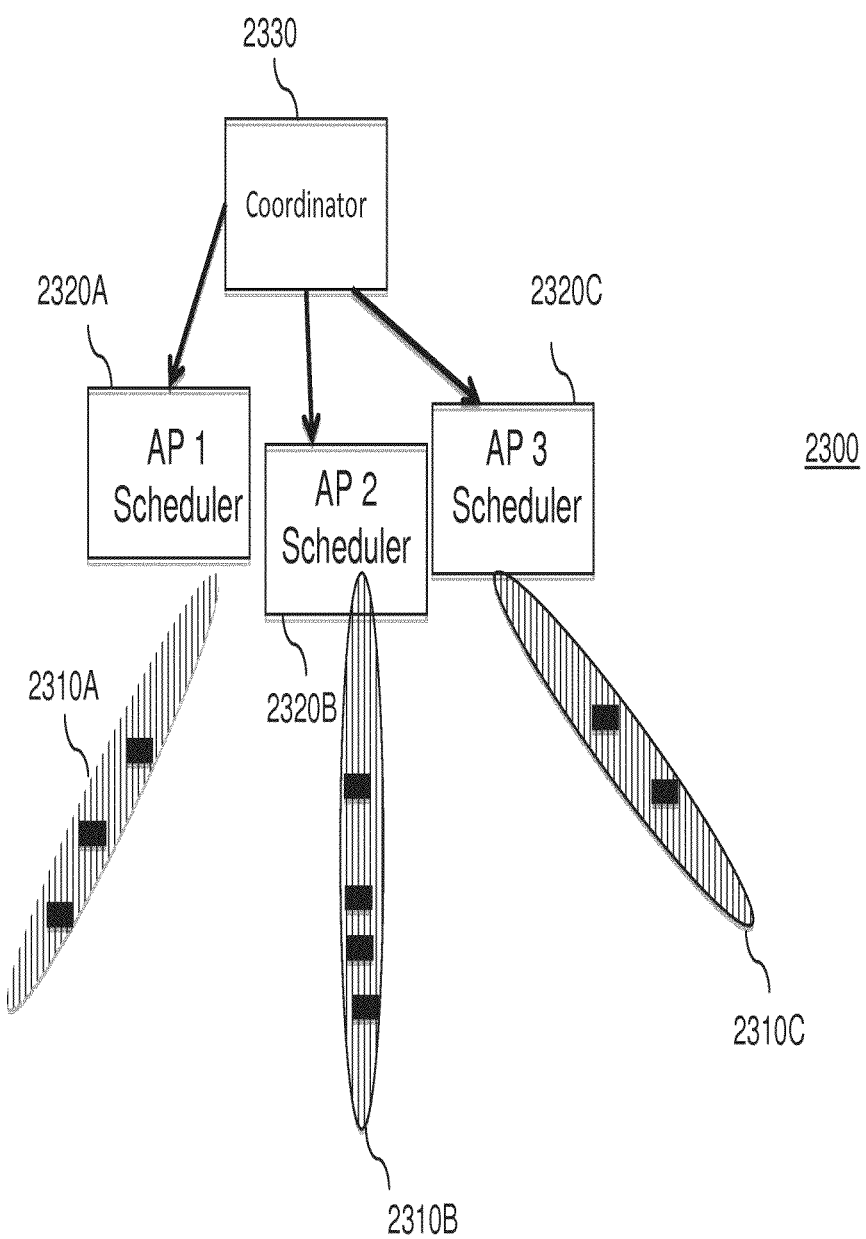
FIG. 23 is a block diagram illustrating using crosstalk data to minimize the crosstalk via scheduling, in accordance with some embodiments of the present invention.

FIG. 23 is a block diagram illustrating a system buildup 2300 using crosstalk information to minimize it via scheduling, in accordance with some embodiments of the present invention. Beams 2310 covering UE may be time multiplexed by their respective AP scheduler 2320 and coordinator 2330 based on the crosstalk information coming from the UEs.

Figure 24:
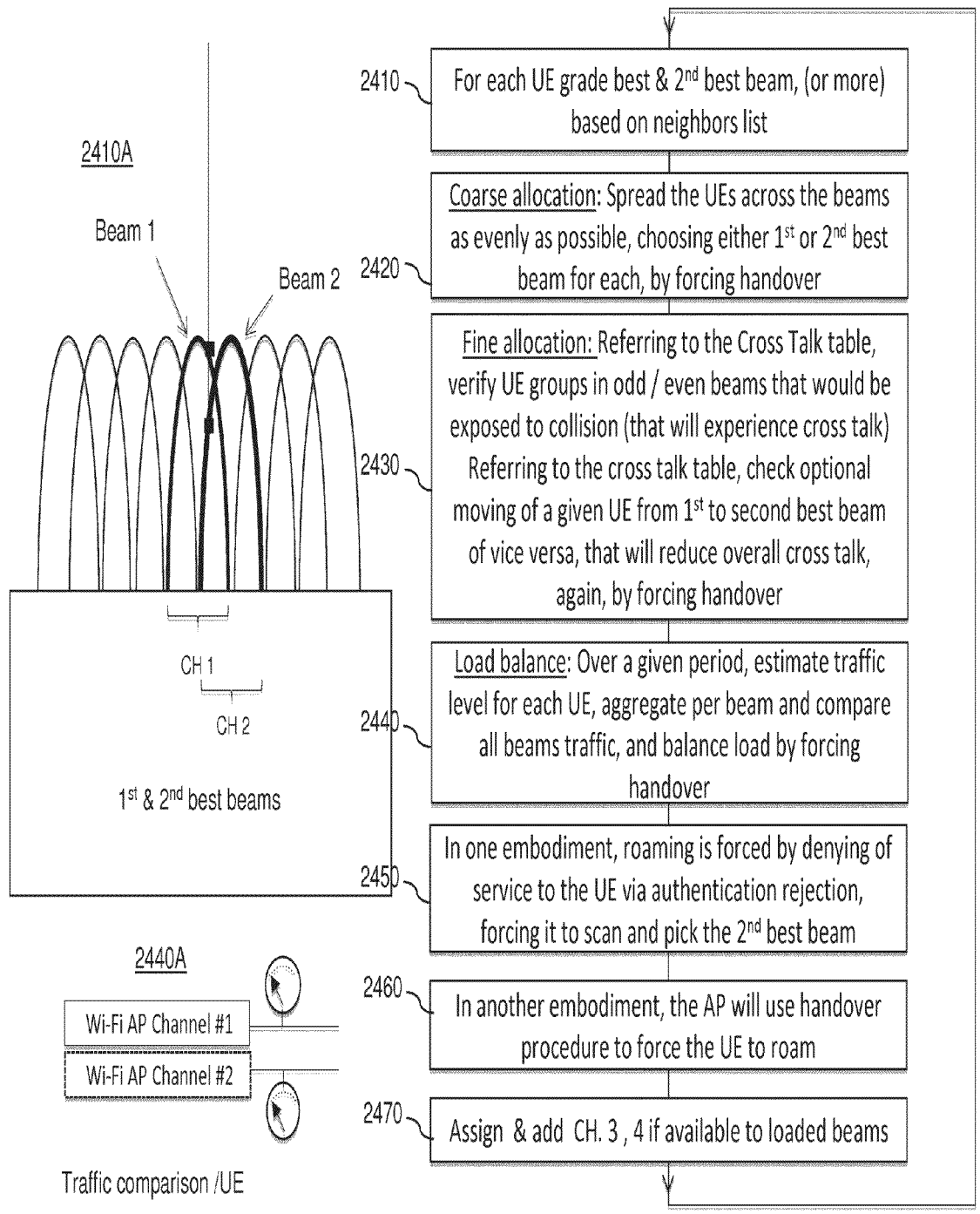
FIG. 24 illustrates a flowchart and a block diagram showing optimizing UEs allocation to beams in accordance with some embodiments of the present invention.

FIG. 24 describes a method 2400 for forcing UEs to roam from its autonomously selected beam into the Multi Beam-AP preferred beam. For each UE grade best and second best beam, (or more) based on neighbors list 2410. Then a coarse allocation process is carried out by spreading the UEs across the beams as evenly as possible, choosing either first or second best beam for each, by forcing handover 2420. The fine allocation process is carried out by referring to the Cross Talk table, verifying UE groups in odd/even beams that would be exposed to collision (e.g., that will experience cross talk) referring to the cross talk table, check optional moving of a given UE from first to second best beam of vice versa, that will reduce overall cross talk, again, by forcing handover 2430. Then, a load balancing process is carried out by estimating, over a given period, a traffic level for each UE, aggregating per beam and comparing all beams traffic, and balancing load by forcing handover 2440. In one embodiment, roaming is forced by denying of service to the UE via authentication rejection, forcing it to scan and pick the second best beam 2450. In another embodiment, the AP will use handover procedure to force the UE to roam 2460. Channel 3 and 4 are then assigned (if available) to loaded beams 2470. The process then restarts at step 2410.

Denial of service to a given UE via authentication process, forces it to scan for alternatives, and thus getting it to hook up on the alternative beam; other methods can be based on temporary reduction of its preferred beam's power while maintaining or temporarily increasing the power of the Multi Beam-AP preferred beam, in such a way that will cause the UE to scan for the alternative and roam to it; yet another way is to temporarily interfere with the QoS or Error Rate of Acknowledgment delivered to that UE, forcing it to scan for alternative, and the like.

Figure 25:
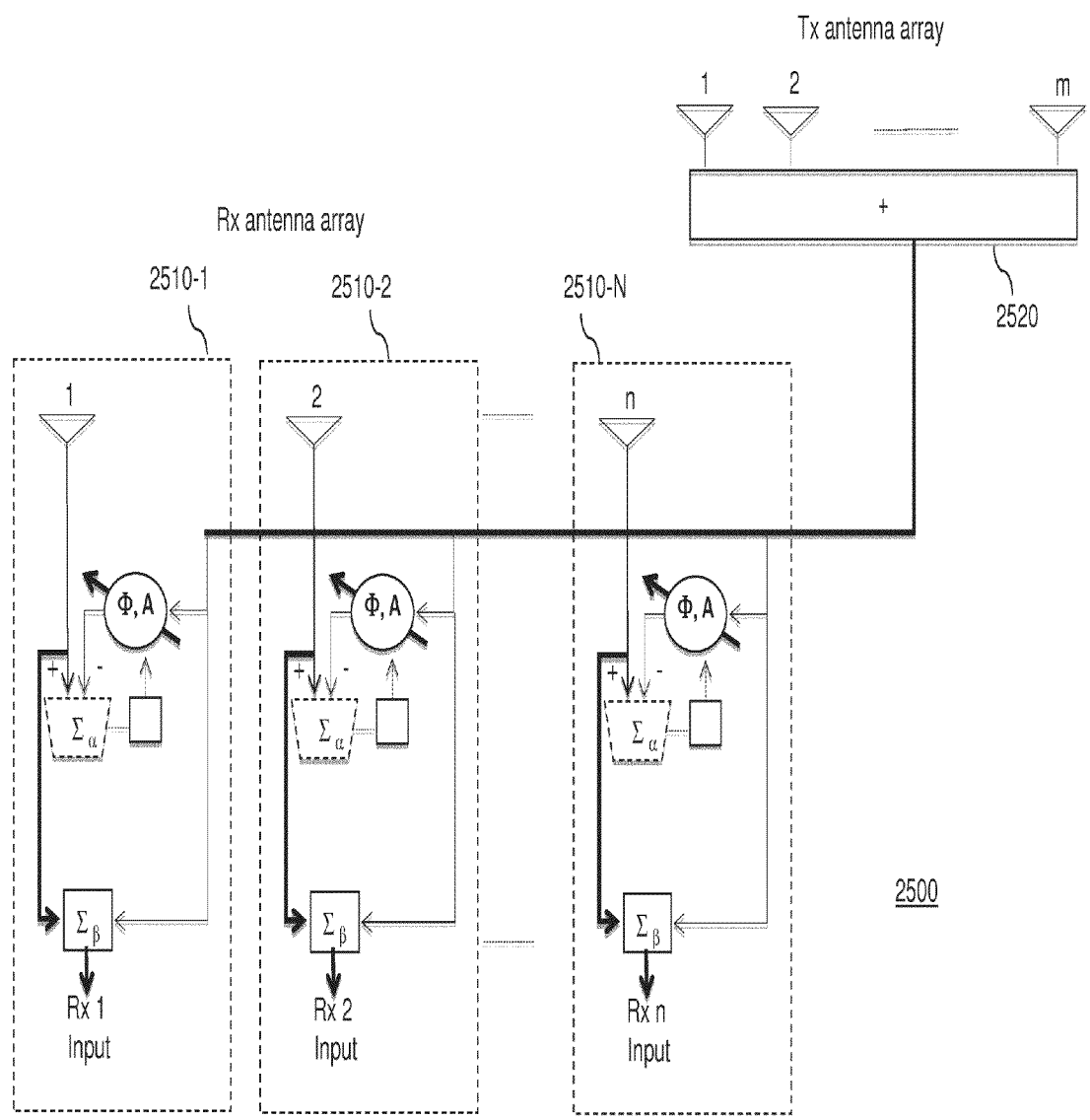
FIG. 25 describes mitigation of possible issues where tapering and cancellation effectiveness are jeopardized by non-flat channel in accordance with embodiments of the present invention.

FIG. 25 addresses an issue of non-flat channel; although BW for Wi-Fi is in the order of 1% in both low and high bands, normally facilitating efficient cancellation and tapering, this invention high isolation requirements can be assisted by super accuracy, which can be provided by separate cancellation circuitry/process for each frequency part independently; such a mechanism can be implemented by segmentation of the bandwidth into subsections and treating each such subsection individually; e.g. with OFDM modulation, it can be done per subcarrier or be Radio Bearer (RB), bringing the cancellation and tapering performance closer to the boundary.

According to some embodiments of the invention, the beam patterns of the transmit antennas exhibit contaminating transmit signals being an accumulated contribution of side lobes and back lobes, wherein the system further includes amplitude/phase modules associated with said transmit antennas and null transmit module configured to receive a difference between signals received by said receive antenna and said contaminating transmit signals detected in the receiving circuitry and control said amplitude/phase modules so that transmit signal component in the receiver are reduced using accurate destructive interference manifested via closed loop.

According to some embodiments of the invention, a sample of transmitted signal of each beam is used as a reference for an individual reduction process for each antenna elements of the receiver systems, or for each beam of the receiver. According to some embodiments of the invention, the reduction is carried out individually per sub-segments of the bandwidth or via Finite Impulse Response (FIR) filtering According to some embodiments of the invention, the APs are configured to have their power level of the transmission, and receiving sensitivity of their receivers, tuned to determine a range of cell's coverage, in a way that sets up most (i.e. more than half) of the UE devices population in an area that is covered by the serving AP receiver's beam, but not covered by non serving APs' receiving side lobes beams.

Figure 26:
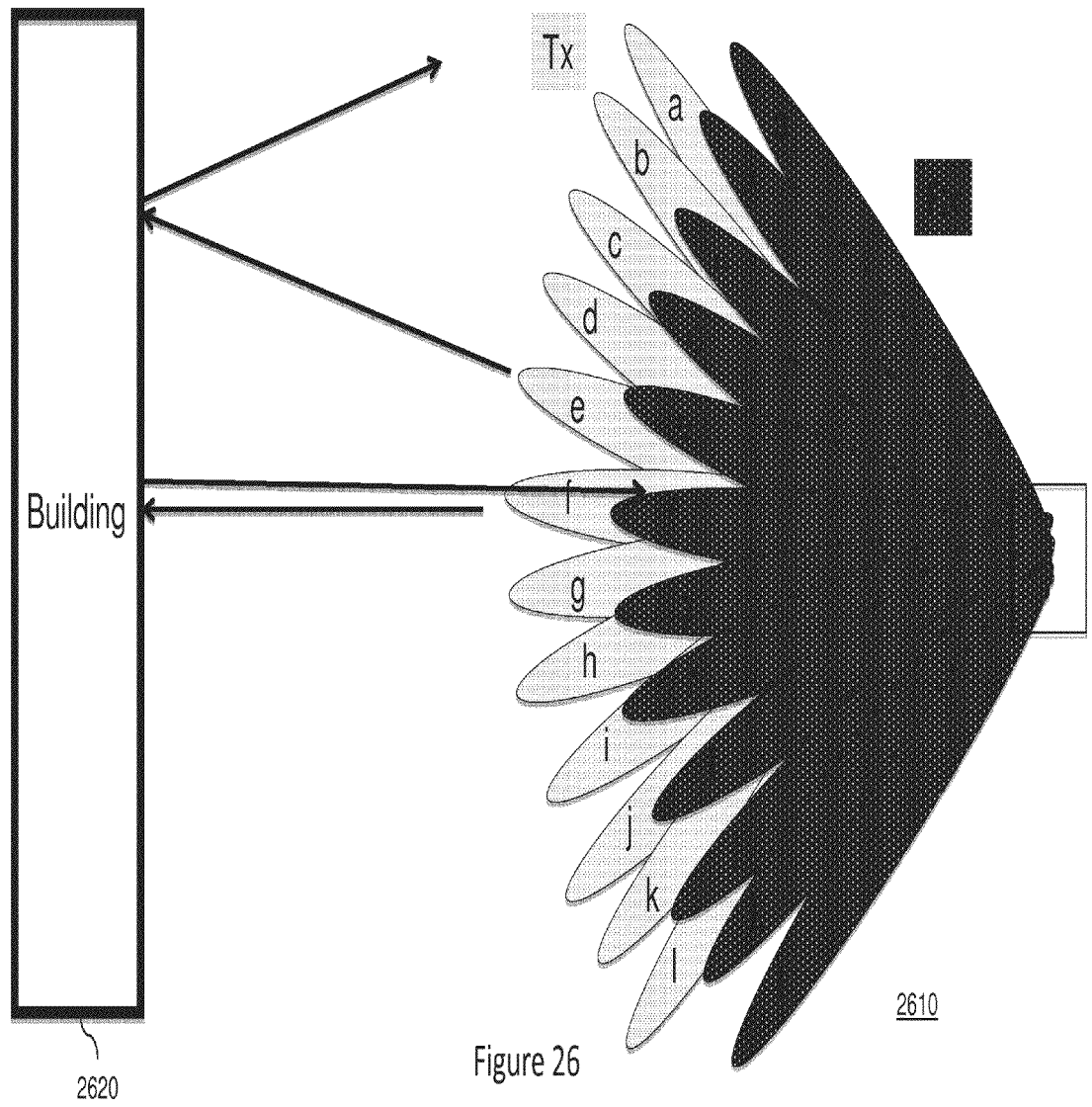
FIG. 26 describes mitigation of possible issues where the Tx array reflection from close by reflectors is introduced into a receiving beam, surpassing the required isolation threshold in accordance with embodiments of the present invention.

FIG. 26 addresses issues that may occur when installing the Site facing a close by building; while most beams are squinted to the right or to the left, creating a Snell reflection from the building wall that deflects away, there may be a perpendicular beam that hits the wall with Tx signal which is being reflected directly back to the Site, picked up by an adjacent receiving beam, and ends up blocking the associated APs from transmitting concurrently or simultaneously with such a beam.

The remedy in such a case is to reduce power of such a beam to the level that eliminates blocking adjacent beams' receivers; another way is to reduce those adjacent beams' receivers' sensitivity; yet another way is to deflect the victim or the victimized beams slightly if excessive reflected signal is not too great, i.e. few dBs.

Figure 27:
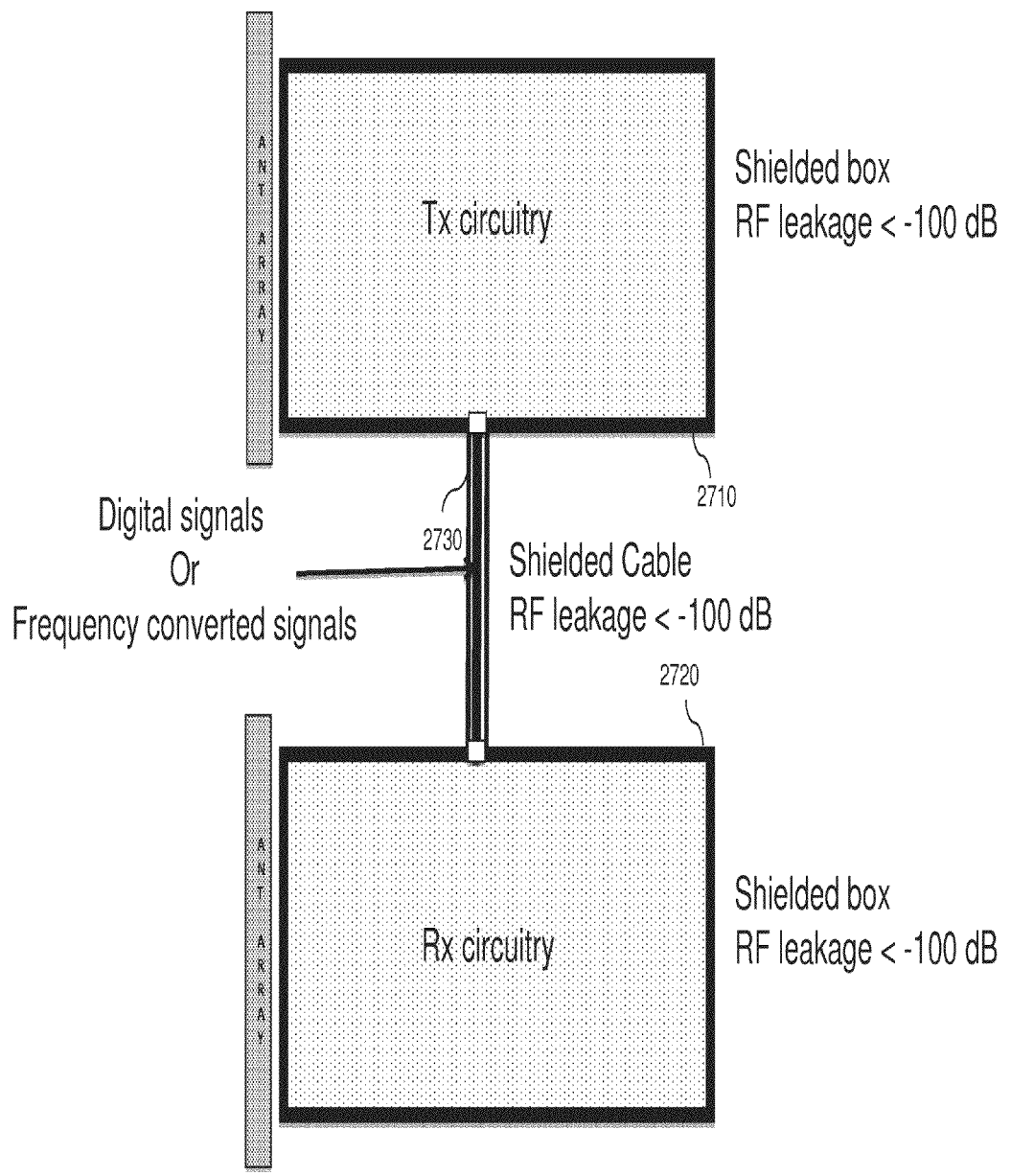
FIG. 27 describes mitigation of possible issues where Tx signal leakage via conductive paths surpasses the required isolation threshold in accordance with embodiments of the present invention.

FIG. 27 addresses conductive leakage that may occur between the various components of the Site, potentially defeating the high radiated isolation by introducing low isolation via current over cables shield, common power supplies, coupling between APs' Radios and the like.

The proposed remedy may include a set of precautions as follows:
1. Housing all Tx circuits separately from Rx ones
2. Packaging units in faraday shielded boxes
3. Implementing inevitable connections between shielded boxes via non-conductive lines like optical couplers, or double shielded coaxial cables According to some embodiments of the invention, a Wi-Fi AP protocol may exhibit a basic medium contention IEEE802.11xx in which Wi-Fi devices packets are not synchronized or delayed and wherein a distributed coordination function is applied via at least one of: carrier sense and random back-off, for collisions avoidance.

According to some embodiments of the invention, the signals generated by the N co-channel Wi-Fi transmitters are sufficiently isolated from their N respective receivers such that a transmission power of a signal received by N−1 of the N co-channel Wi-Fi transmitters is lower than a white Gaussian noise level present at the N respective receivers.

According to some embodiments of the invention, the system further include a gateway and an access point coordinator 550*a* or 550 configured to instruct the beamformers to spatially manipulate the beams, based on data received from the Wi-Fi UE devices, so as to maintain the sufficient isolation between the beams, over time.

According to some embodiments of the invention, a population or group of served UE devices is subdivided into two groups: a first group in which the transmission of a UE device served by a given beam is received by one or more beams' receivers, and a second group in which UE devices' transmission is receivable exclusively by its serving beam.

According to some embodiments of the invention, the first group is allocated with one Wi-Fi channel and served by an omni/wide sector antenna, and wherein the second group is allocated with a second and a third Wi-Fi channel and is served by the directional beams.

According to some embodiments of the invention, the system further include a coordinator which serves the plurality of APs, and configured to perform traffic analysis and to execute load sharing between beams by forcing UE devices handover based on load balancing requirements.

According to some embodiments of the invention, the forcing of the UE devices handover between beams is carried out via Extended Service Set (ESS), or via AP denial of service to a given UE device at a given beam.

According to some embodiments of the invention, the crosstalk between co-channel directional beams is periodically estimated using UE devices estimation of alternative or neighboring N APs, and a relative power level of such neighbors versus the serving AP is reported by the UE to the AP, to be reported to the coordinator, generating for each UE crosstalk values originated by N−1 co channel directional beams.

According to some embodiments of the invention, the coordinator initiates a handover of victim UE devices being affected by victimizing beams which cause crosstalk to said UE devices, to said victimizing beams.

According to some embodiments of the invention, the coordinator reports a crosstalk table indicating crosstalk between victimizing beams and victim UE devices to the victimizing beams and the victim UE devices and the APs feeding the victim UE and the victimizing beam perform time sharing when victim UEs are served.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system."

In various embodiments, computational modules may be implemented by e.g., processors (e.g., a general purpose computer processor or central processing unit executing software), or digital signal processors (DSPs), or other circuitry. The baseband modem may be implanted, for example, as a DSP. A beamforming matrix can be calculated and implemented for example by software running on general purpose processor. Beamformers, gain controllers, switches, combiners, and phase shifters may be implemented, for example using RF circuitries.

The flowchart and block diagrams herein illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system comprising:
one or more Wi-Fi transmit antennas beamformers;
one or more Wi-Fi receive antennas; and
a number N of co-located co-channel Wi-Fi access points (APs) which comply with the IEEE 802.11 standard having Wi-Fi transmitters and receivers and connected to the Wi-Fi transmit antennas beamformers and the Wi-Fi receive antennas, wherein the Wi-Fi transmit antennas beamformers are configured to produce and transmit a plurality of directional beams of a common frequency, directed at a plurality of Wi-Fi user equipment (UE) devices such that the directional beams are sufficiently isolated from each other, so that at least some of the Wi-Fi UE devices communicate simultaneously with the plurality of Wi-Fi APS,
wherein the receive and/or transmit antennas comprise an array of antenna elements and wherein said arrays are implemented with tapering that reduces side lobe levels of the beams, and wherein the tapering is carried out by monitoring traces of transmitted signals originated from said APs, and manipulating antenna weights to reduce said traces, and wherein said traces are fed into a cancellation process in which said traces are subtracted from samples of the original signal.

2. The system according to claim 1, wherein the Wi-Fi AP protocol has a basic medium contention IEEE 802.11 in which Wi-Fi devices packets are not synchronized or delayed and wherein a distributed coordination function is applied via at least one of: carrier sense and random back-off, for collisions avoidance.

3. The system according to claim 1, wherein signals generated by the N co-channel Wi-Fi transmitters are sufficiently isolated from N respective receivers such that a transmission power of a signal received by N−1 of the N co-channel Wi-Fi transmitters is lower than a white Gaussian noise level present at the N respective receivers.

4. The system according to claim 3, wherein the isolation is achieved by a spatial separation that attenuates the transmitted signal of the directional beams by at least 100 dB.

5. The system according to claim 3, wherein the receive antennas and/or the transmit antennas are positioned so that side lobes are directed to each other, wherein the antennas are designed such that said side lobes are suppressed.

6. The system according to claim 1, wherein the directional beams use a first Wi-Fi frequency channel, said system further comprising an omni/sector antenna using a second Wi-Fi frequency channel whose power leakage to the first Wi-Fi frequency channel is lower than −90 dBm, wherein gaps between the directional beams using said first Wi-Fi frequency channel, are filled by the omni/sector antenna using the second Wi-Fi frequency channel.

7. The system according to claim 1, wherein the one or more Wi-Fi receive antennas are implemented by one or more beamformers.

8. The system according to claim 1, further comprising a gateway and an access point coordinator configured to instruct the beamformers to spatially manipulate the beams, based on data received from the Wi-Fi UE devices, so as to maintain the sufficient isolation between the beams, over time.

9. The system according to claim 1, wherein at least some of the directional beams are served by a single AP.

10. The system according to claim 1, wherein a population of served UE devices is subdivided into two groups: a first group in which the transmission of a UE device served by a given beam is received by one or more beams' receivers, and a second group in which UE devices' transmission is receivable exclusively by its serving beam.

11. The system according to claim 10, wherein the first group is allocated with one Wi-Fi channel and served by an omni/wide sector antenna, and wherein the second group is allocated with a second and a third Wi-Fi channel and is served by the directional beams.

12. The system according to claim 1 wherein said directional beams have a side lobe pattern of approximately −30 dB, achieved via digital tapering, implemented by both mathematical calculation and closed loop cancellation using feedback from at least one of: UE devices and calibration transmitters.

13. The system according to claim 1 wherein digital beamforming is performed by using an integrated Wi-Fi AP chip, converting all of the transmission RF paths into low frequency, digitizing, converting all of the receiving RF paths into low frequency and digitizing it, feeding said digital signals into a digital processing module which performs beamforming, tapering and cancellation, and then converting the outputs of the said digital processing module back to RF level and feeding the transmission and the receiving antenna arrays.

14. The system according to claim 1 where digital beamforming is performed by separating AP chip sets into two parts, one being the transceiver, the other being the baseband, lining up the baseband in groups and connecting the baseband to inputs of a digital processing module which performs beam forming, tapering, and cancellation, the transceiver in similar groups and connecting transceiver to the outputs of the said digital processing module, wherein the RF portion of the said transceivers are connected to a Transmission Antenna Array and a Receiving Antenna Array.

15. The system according to claim 1, wherein APs are configured to tune power level of the transmission and receiving sensitivity of receivers, to establish a range of coverage, so as to maximize the UE device population in an area covered by the serving AP receiver's beam, but not covered by non-serving APs' receiving sidelobe beams.

16. The system according to claim 1, wherein the Wi-Fi transmit antennas beamformers are configured to produce and transmit a plurality of directional beams of at least first and second common frequencies having power leakage lower than −90 dBm, wherein gaps between the directional beams using the first Wi-Fi frequency channel are filled by directional beams using the second Wi-Fi frequency channel.

17. A system comprising:
one or more Wi-Fi transmit antennas beamformers;
one or more Wi-Fi receive antennas;

a number N of co-located co-channel Wi-Fi access points (APs) which comply with the IEEE 802.11 standard having Wi-Fi transmitters and receivers and connected to the Wi-Fi transmit antennas beamformers and the Wi-Fi receive antennas, wherein the Wi-Fi transmit antennas beamformers are configured to produce and transmit a plurality of directional beams of a common frequency, directed at a plurality of Wi-Fi user equipment (UE) devices such that the directional beams are sufficiently isolated from each other, so that at least some of the Wi-Fi UE devices communicate simultaneously with the plurality of Wi-Fi APS; and a coordinator which serves the plurality of APs, and is configured to perform traffic analysis and to execute load sharing between beams by forcing UE devices handover based on load balancing requirements, wherein the coordinator reports a crosstalk table indicating crosstalk between victimizing beams and victim UE devices and wherein the APs feeding the victim UE and the victimizing beam perform time sharing when victim UEs are served.

18. The system according to claim 17, wherein the forcing of the UE devices handover between beams is carried out via Extended Service Set (ESS), or via AP denial of service to a given UE device at a given beam.

19. The system according to claim 17, wherein crosstalk between co-channel directional beams is periodically estimated using UE devices estimation of alternative or neighboring N APs, and a relative power level of such neighbors versus the serving AP is reported by the UE to the AP, to be reported to the coordinator, generating for each UE crosstalk values originated by N−1 co channel directional beams.

20. The system according to claim 19, wherein the coordinator initiates a handover of victim UE devices being affected by victimizing beams which cause crosstalk to said UE devices, to said victimizing beams.

21. A system comprising:
one or more Wi-Fi transmit antennas beamformers;
one or more Wi-Fi receive antennas; and
a number N of co-located co-channel Wi-Fi access points (APs) which comply with the IEEE 802.11 standard having Wi-Fi transmitters and receivers and connected to the Wi-Fi transmit antennas beamformers and the Wi-Fi receive antennas,
wherein the Wi-Fi transmit antennas beamformers are configured to produce and transmit a plurality of directional beams of a common frequency, directed at a plurality of Wi-Fi user equipment (UE) devices such that the directional beams are sufficiently isolated from each other, so that at least some of the Wi-Fi UE devices communicate simultaneously with the plurality of Wi-Fi APS, and
wherein beam patterns of the transmit antennas exhibit contaminating transmit signals being an accumulated contribution of side lobes and back lobes, wherein the system further comprises amplitude/phase modules associated with said transmit antennas and null transmit module configured to receive a difference between signals received by said receive antenna and said contaminating transmit signals detected in the receiving circuitry and control said amplitude/phase modules so that transmit signal component in the receiver are reduced using accurate destructive interference manifested via closed loop.

22. The system according to claim 21, wherein the system is to perform an individual reduction process for each antenna elements of the receiver systems, or for each beam of the receiver, using a sample of the transmitted signal of each beam as a reference.

23. The system according to claim 22, wherein said reduction is carried out individually per sub-segments of the bandwidth or via Finite Impulse Response (FIR) filtering.

24. A method comprising:
providing one or more Wi-Fi transmit antennas beamformers;
providing one or more Wi-Fi receive antennas;
providing a number N of co-located co-channel Wi-Fi access points (APs) which comply with IEEE 802.11 standard, connected to the Wi-Fi transmit antennas beamformers; and
producing a plurality of spatially directional beams of a common frequency, directed at a plurality of Wi-Fi user equipment (UE) such that the directional beams are sufficiently isolated from each other, so that at least some of the Wi-Fi UEs communicate simultaneously with the plurality of Wi-Fi access points,
wherein the receive and/or transmit antennas comprise an array of antenna elements and wherein said arrays are implemented with tapering that reduces side lobe levels of the beams, and
wherein the tapering is carried out by monitoring traces of transmitted signals originated from said APs, and manipulating antenna weights to reduce said traces, and wherein said traces are fed into a cancellation process in which said traces are subtracted from samples of the original signal.

25. The method according to claim 24, wherein the Wi-Fi AP protocol has a basic medium contention IEEE 802.11 in which Wi-Fi devices packets are not synchronized or delayed and where a distributed coordination function is applied via at least one of: carrier sense and random back-off, for collisions avoidance.

26. The method according to claim 24, wherein the N co-channel Wi-Fi transmitters are sufficiently isolated from N respective receivers such that the transmission power received by N−1 of the N co-channel Wi-Fi transmitters is lower than a white Gaussian noise present in the N respective receivers.

27. The method according to claim 24, where a sample of transmitted signal of each beam, is used as a reference for an individual cancellation process for each antenna elements of the receiver systems, or for each beam of the receiver system.

28. The method according to claim 24, wherein APs are configured to have power level of the transmission, and receiving sensitivity of receivers, tuned to determine a range of cell's coverage, in a way that sets up most of the UE devices population in an area that is covered by the serving AP receiver's beam, but not covered by non serving APs' receiving sidelobes beams.

* * * * *